United States Patent [19]

Kaneko et al.

[11] Patent Number: 5,216,480
[45] Date of Patent: Jun. 1, 1993

[54] SURVEYING INSTRUMENT

[75] Inventors: Atsumi Kaneko; Yukio Eda, both of Tokyo, Japan

[73] Assignee: Asahi Kogaku Kogyo K.K., Tokyo, Japan

[21] Appl. No.: 837,693

[22] Filed: Feb. 19, 1992

Related U.S. Application Data

[63] Continuation of Ser. No. 629,018, Dec. 18, 1990, abandoned, which is a continuation of Ser. No. 288,908, Dec. 23, 1988, abandoned.

[30] Foreign Application Priority Data

Dec. 26, 1987 [JP] Japan ................... 62-330417
Jan. 15, 1988 [JP] Japan ................... 63-7255
Feb. 1, 1988 [JP] Japan ................... 63-21761
Feb. 1, 1988 [JP] Japan ................... 63-21762

[51] Int. Cl.⁵ ............... G01B 11/26; G01J 1/20; H04N 5/225
[52] U.S. Cl. ................. 356/152; 250/203.2; 250/206.1; 250/206.2; 356/141; 358/125; 358/126
[58] Field of Search ........... 356/141, 152, 5; 358/125, 126; 250/203.2, 206.1, 206.2

[56] References Cited

U.S. PATENT DOCUMENTS

| | | | |
|---|---|---|---|
| 3,603,686 | 9/1971 | Paine et al. ............. | 356/152 |
| 3,769,456 | 10/1973 | Woulfson ............. | 358/126 |
| 3,828,122 | 8/1974 | McPhee et al. ........ | 250/203 CT |
| 3,903,361 | 9/1975 | Alpers ................. | 358/125 |
| 3,954,340 | 5/1976 | Blomquist et al. ..... | 356/152 |
| 4,113,381 | 9/1978 | Epstein ................. | 356/152 |
| 4,155,096 | 5/1979 | Thomas et al. ......... | 358/125 |
| 4,272,783 | 6/1981 | Warnstam et al. ...... | 358/126 |
| 4,386,848 | 6/1983 | Clendenin et al. ..... | 356/152 |
| 4,560,270 | 12/1985 | Wiklund et al. ....... | 356/141 |
| 4,682,218 | 7/1987 | Kaneko . | |
| 4,712,915 | 12/1987 | Kosakowski et al. ... | 356/152 |

FOREIGN PATENT DOCUMENTS 60-205383 10/1985 Japan .
62-15479 1/1987 Japan .
62-194413 8/1987 Japan .

Primary Examiner—Stephen C. Buczinski
Attorney, Agent, or Firm—Sughrue, Mion, Zinn, Macpeak & Seas

[57] ABSTRACT

A surveying instrument comprising optical system means having an optical axis to be coincided with an object to be observed, positional deviation detecting means for detecting the deviation of said optical axis with respect to the object and either means for displaying the detection result of said positional deviation detecting means or means for driving said optical system according to the detection results of said positional deviation detecting means so as to bring said axis in coincidence with the object. According to the present invention, an observer can achieve surveying operation over watching the display, and thus easy and accurate operation is possible.

18 Claims, 24 Drawing Sheets

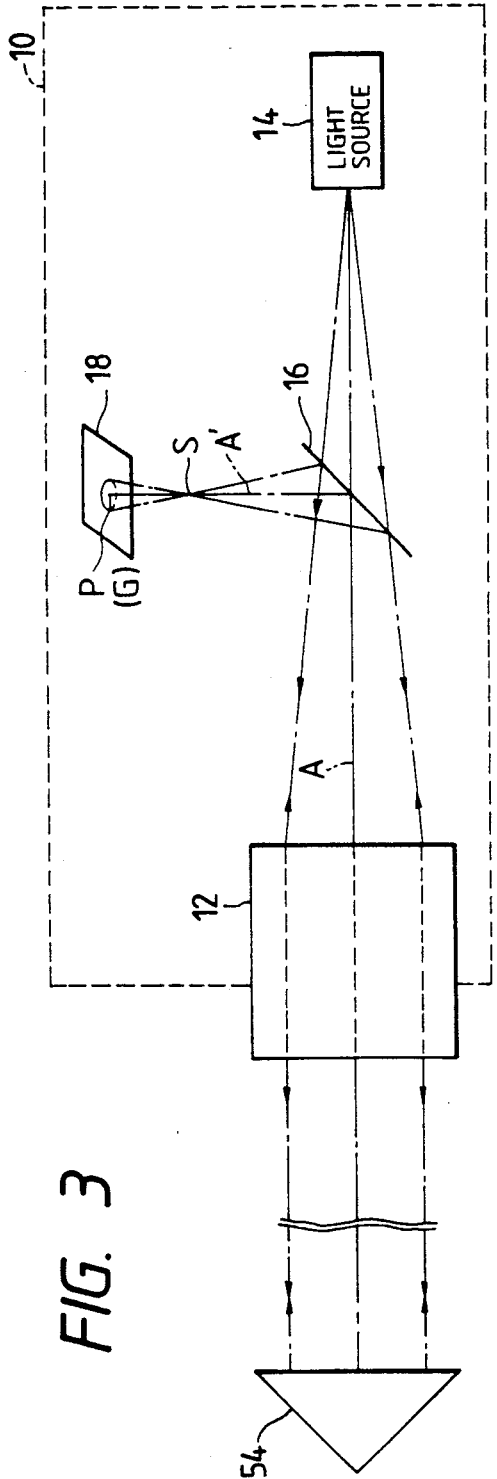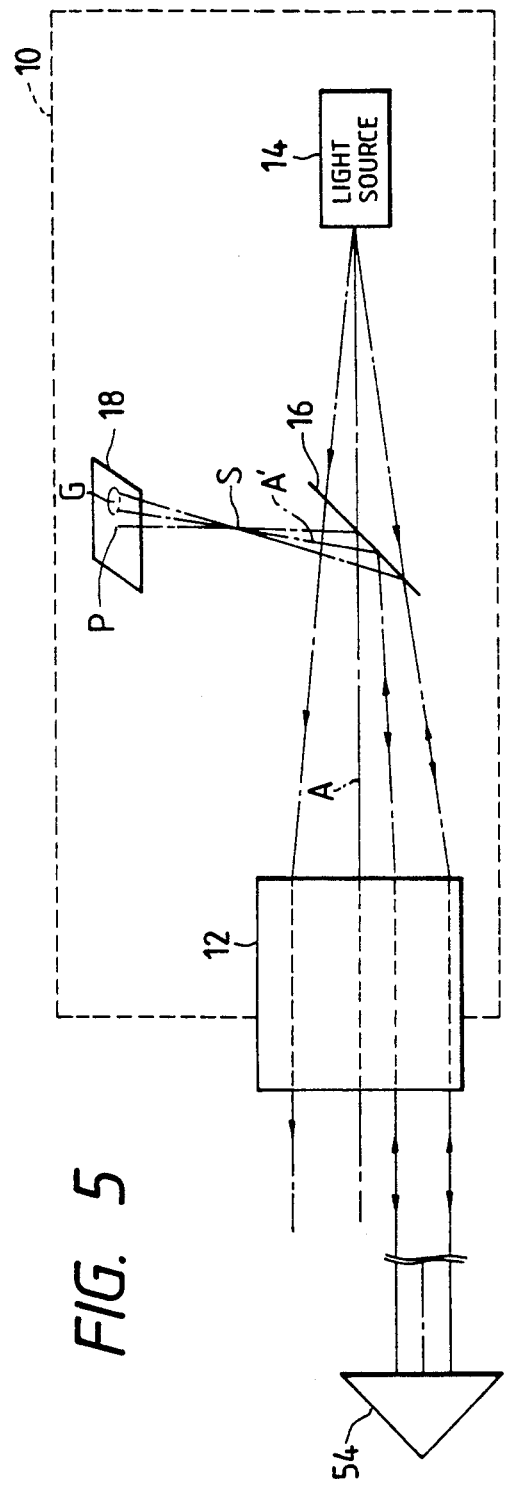

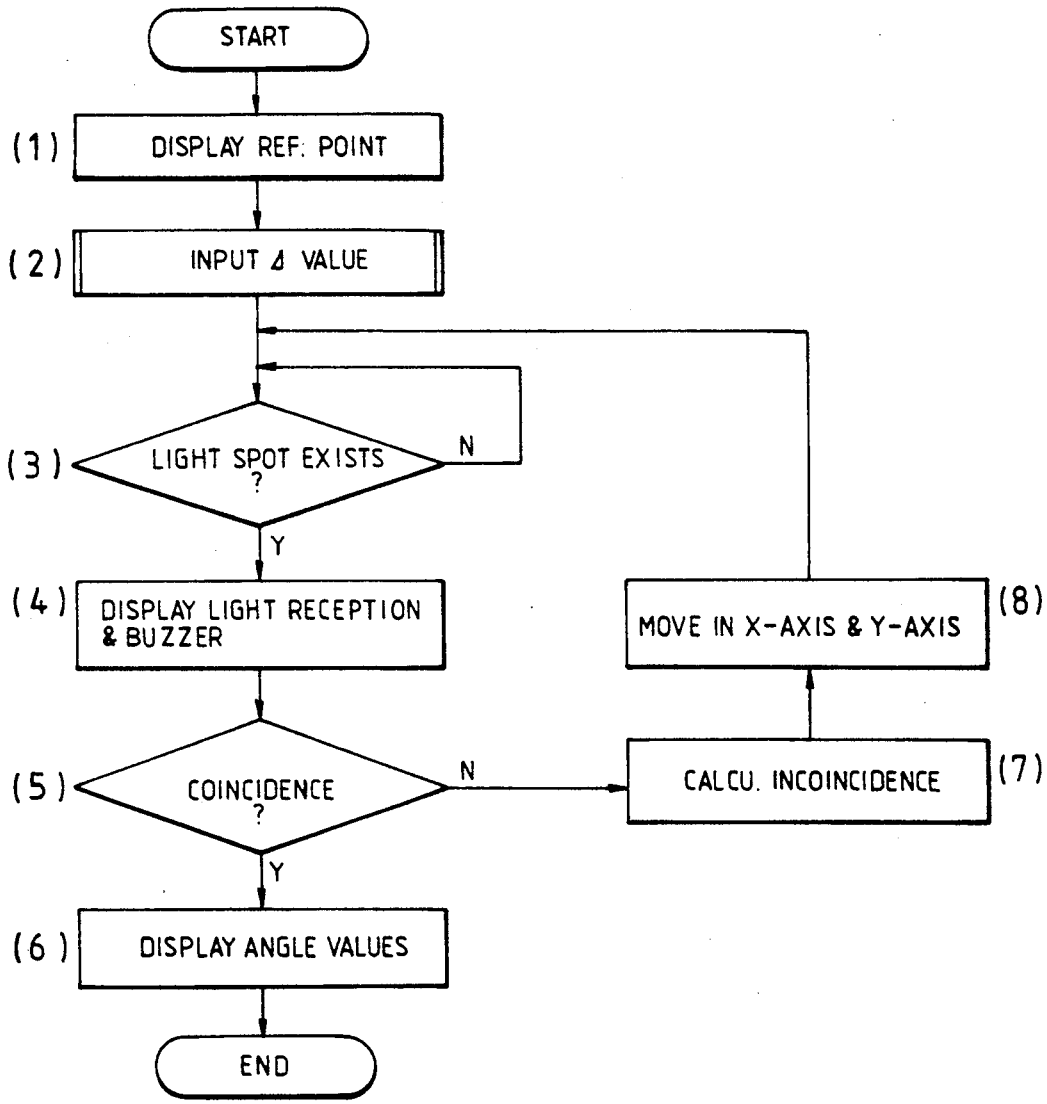

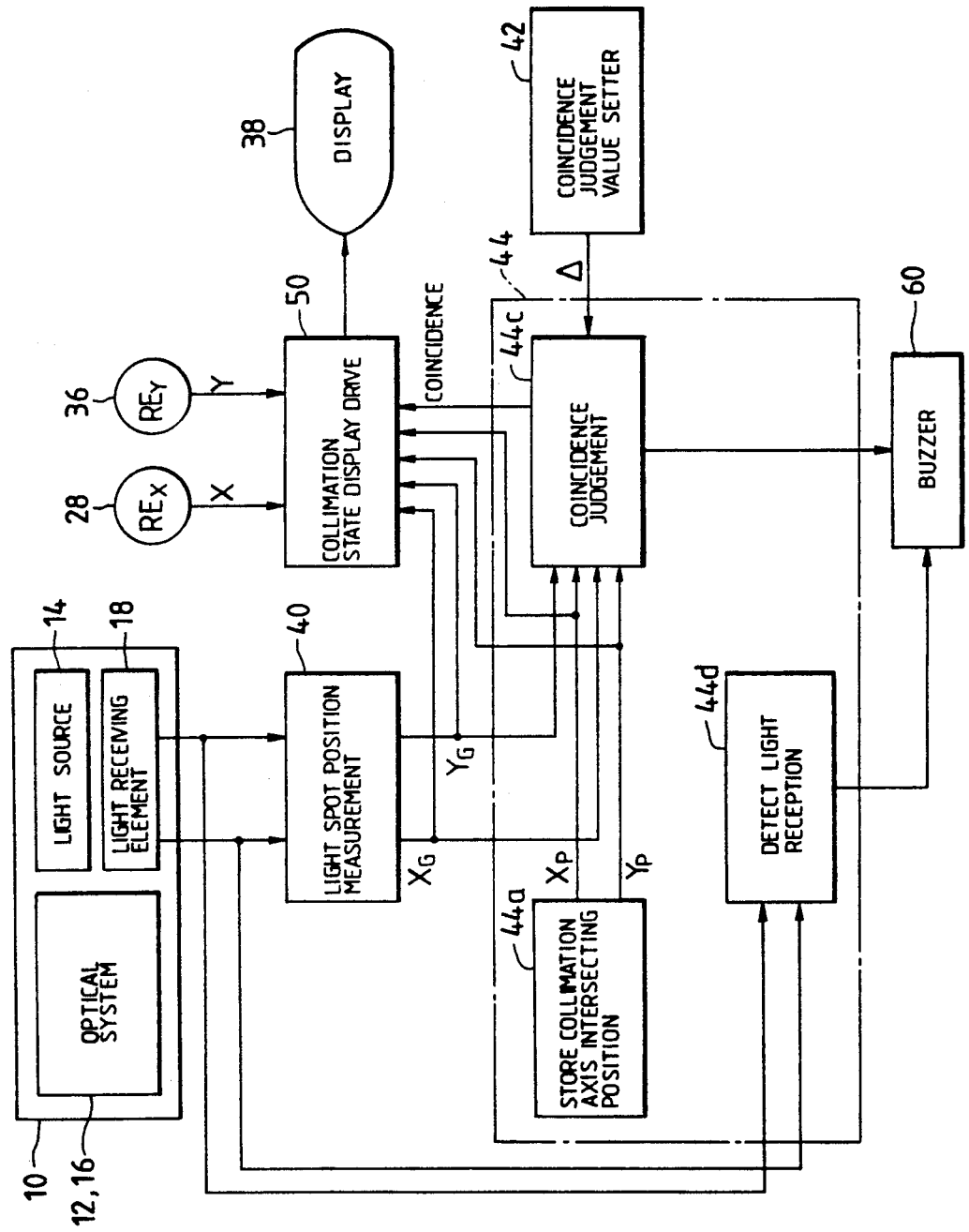

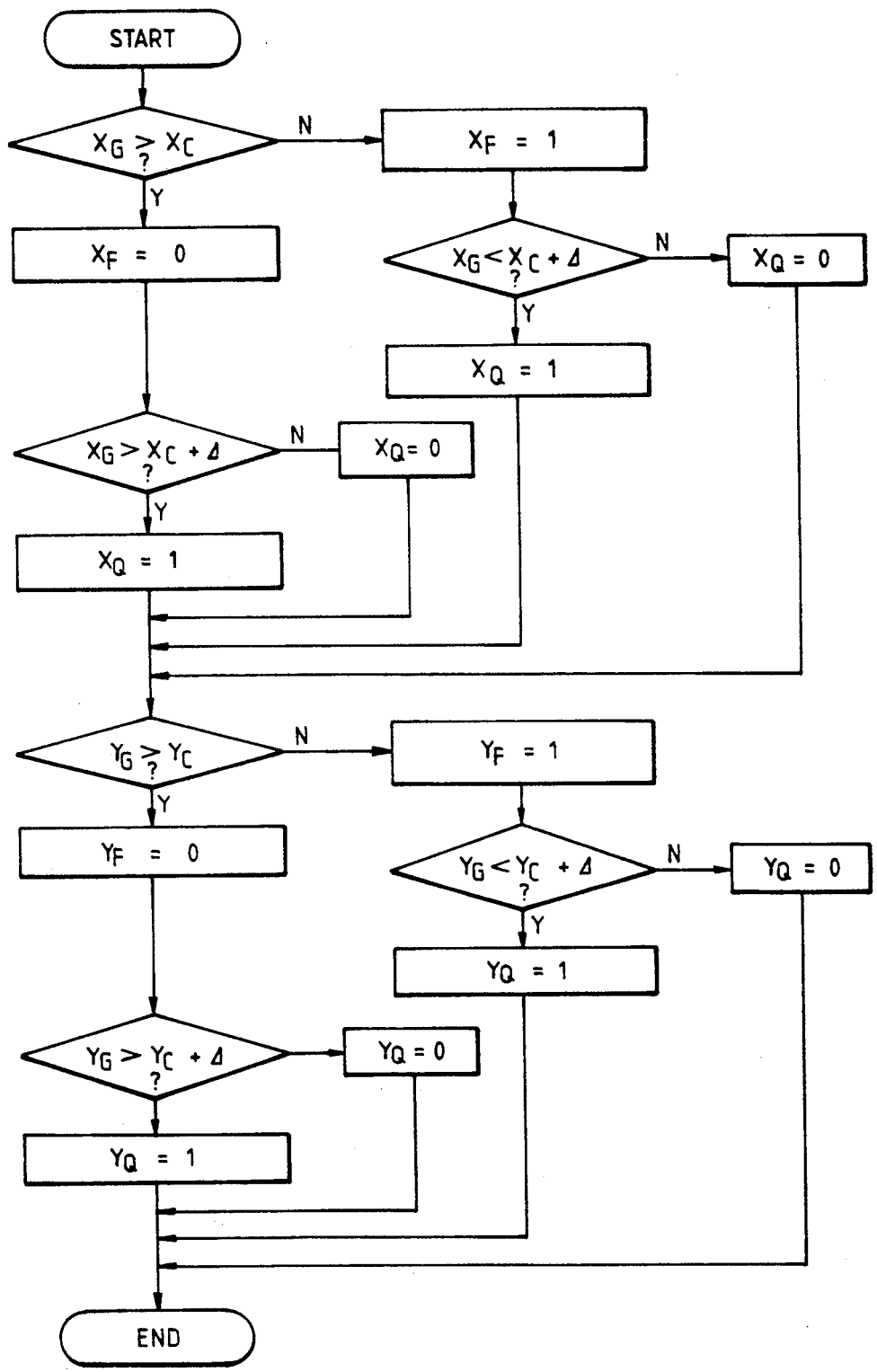

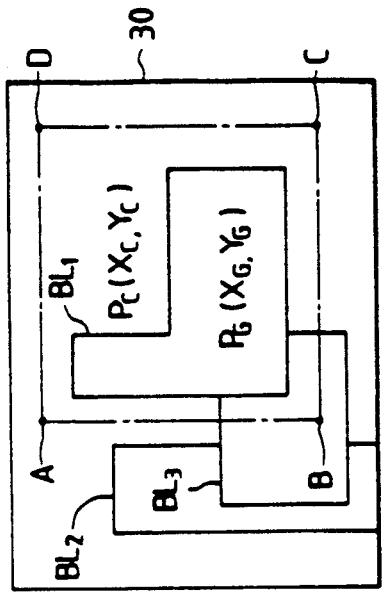
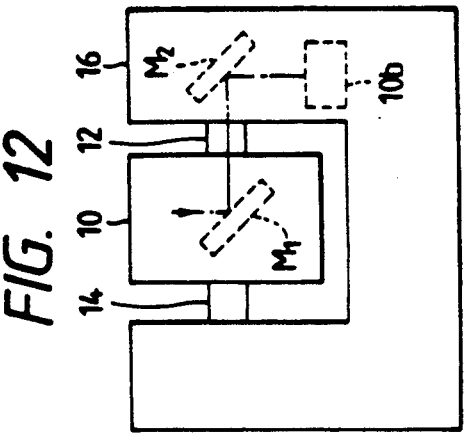
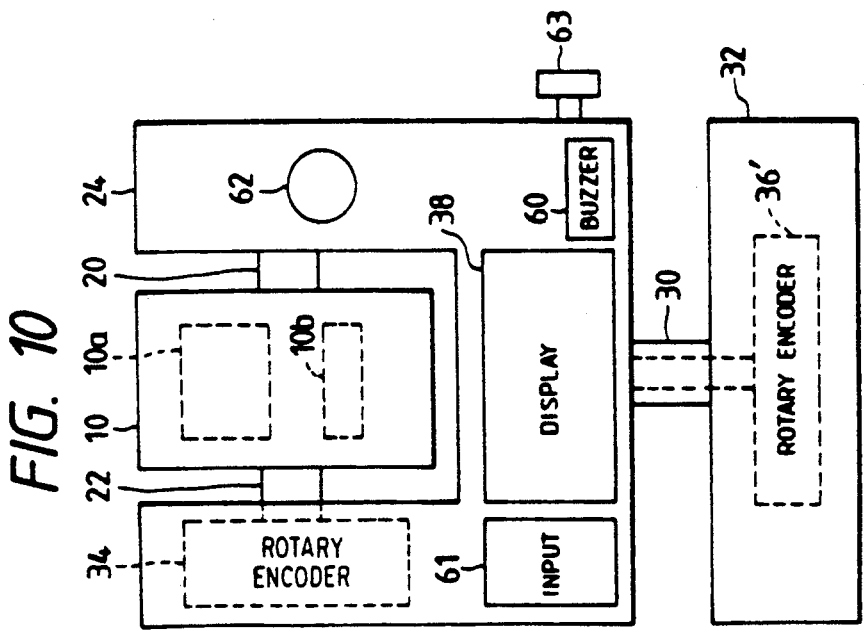

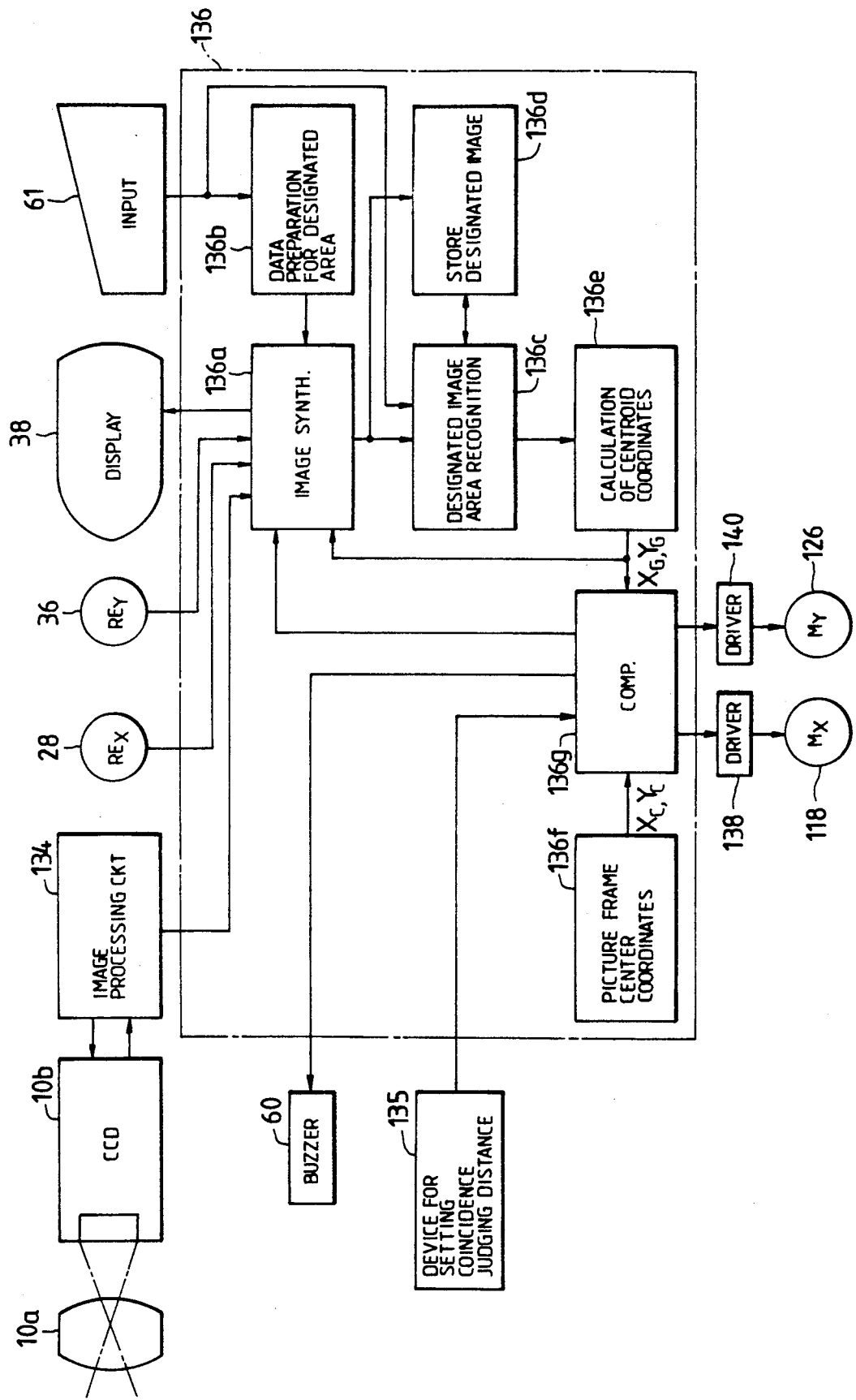

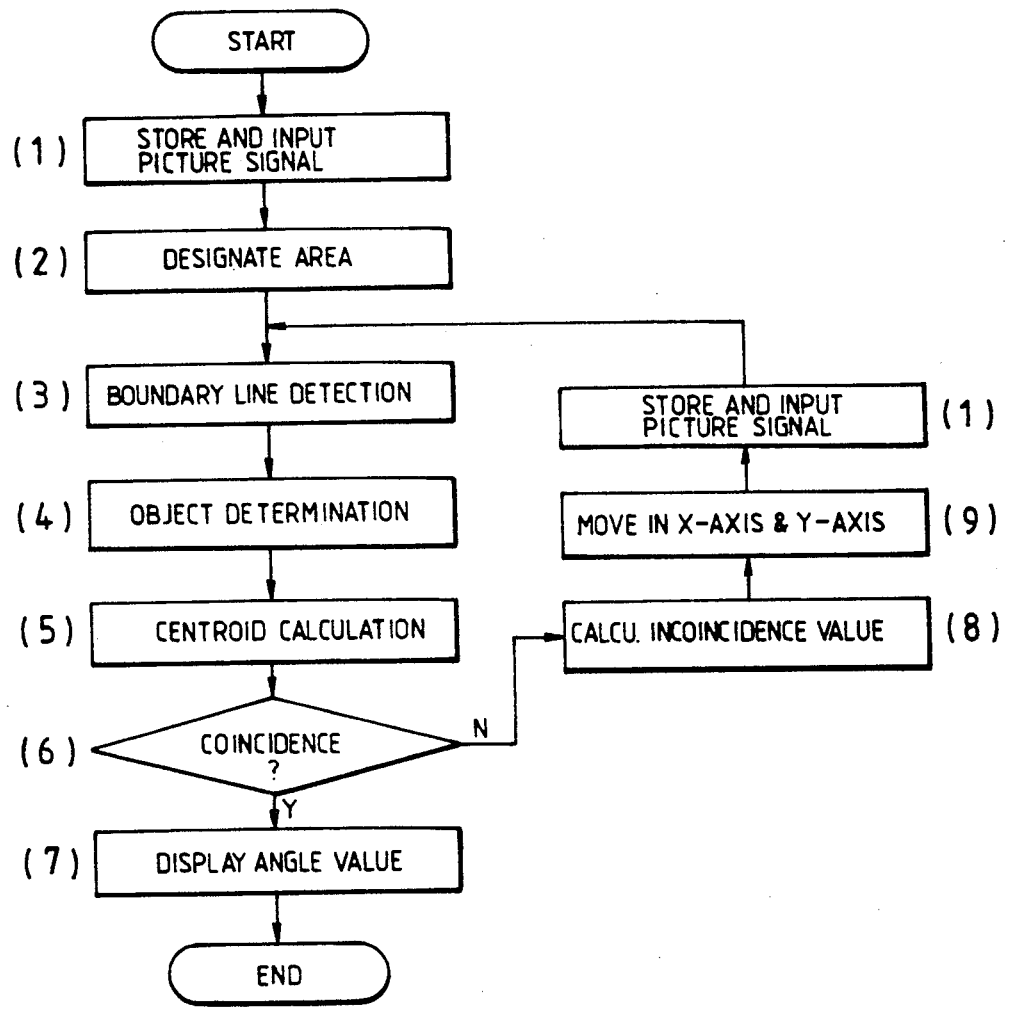

SURVEYING INSTRUMENT

This is a continuation of application Ser. No. 07/629,018 filed on Dec. 18, 1990, which is a continuation of parent application Ser. No. 07/288,908 filed Dec. 23, 1988, now both abandoned, of Atsumi Kaneko and Yukio Eda entitled "Surveying Instrument".

BACKGROUND OF THE INVENTION

The present invention relates to a surveying instrument for measuring distance, level, azimuth or the like.

Heretofore, collimation of a surveying instrument is carried out by directing an optical axis (referred to as a collimation axis hereinafter) of a telescope, and peering through the telescope so as to bring the central point of an object in the field of view to be coincident with the intersection of cross hairs on the collimation axis.

However, the position of an observer's eye with respect to an ocular lens varies depending upon the direction of observation, an observer's ability, degree of fatigue of observer or the like, as a result of which even if the adjustment of the telescope in the collimation axis direction is carried out accurately, there may occur an error for every surveying. Furthermore, the above-mentioned adjustment has been carried out manually and therefore it may be somewhat difficult to make the accuracy of the adjustment constant for every surveying depending upon the observation direction, the observer's ability, the degree of fatigue of the observer or the like, similar to the above, resulting in worsening of the surveying error.

Moreover, since the surveying is carried out by visual observation, the surveying becomes difficult when the object is dimly lit.

SUMMARY OF THE INVENTION

Accordingly, an object of the present invention is to provide a surveying instrument which is unaffected by an observation direction, an observer's ability, and degree of fatigue of the observer, and which is adapted for automatic collimation even when an object is dimly lit.

In order to attain the above object, according to the present invention, an example of the surveying instrument comprises, as shown in FIG. 1, an optical system block including integrally a light source, a beam position detector for detecting the position of a light spot on a light receiving surface and an optical system for projecting a light beam radiated by the light source onto a light reflecting means attached to the object, and then forming the light spot on the light receiving surface by converging the light beam reflected from the light reflecting means; positional deviation calculating means for calculating the positional deviation of the light spot position with respect to the intersecting position of the collimation axis of the optical system block and the light receiving surface; driving means for moving the collimation axis of the optical system block; and control means for controlling the driving means so as to make the positional deviation substantially equal to zero.

The above object of the present invention is also accomplished by the provision of a surveying instrument comprising the above described optical system block and display means for displaying the intersection position and the light spot position. With this modification, an observer adjust the light spot position while watching the display means.

BRIEF DESCRIPTION OF THE DRAWINGS

In the accompanying drawings;

FIG. 2 through FIG. 5 concerns a first embodiment of the present invention in which FIG. 2 is a schematic diagram illustrating a front view of the surveying instrument according to the present invention;

FIG. 3 is a diagram showing an optical system employed in the present surveying device;

FIG. 4 is a block diagram showing the first embodiment of the present invention in detail;

FIG. 4(D) is a flow chart for the operation of the first embodiment;

FIG. 5 is a diagram showing the case in which the collimation axis A of FIG. 3 deviates from the center of the corner cube 54;

FIG. 6 is a block diagram showing a second embodiment of the present invention;

FIG. 9(L) is a flow chart showing a method of calculating incoincidence amount;

FIG. 10 is a schematic diagram illustrating a front view of the surveying instrument according to the present invention;

FIG. 11 is a diagram illustrating an example of a picture displayed on the display 38;

FIG. 12 is a schematic diagram illustrating a modification of an optical system according to the present invention;

FIG. 15 is a block diagram showing a fourth embodiment of the present invention;

FIG. 15(B) is a flow chart for the operation of the fourth embodiment.

DESCRIPTION OF PREFERRED EMBODIMENTS

Figure 1:
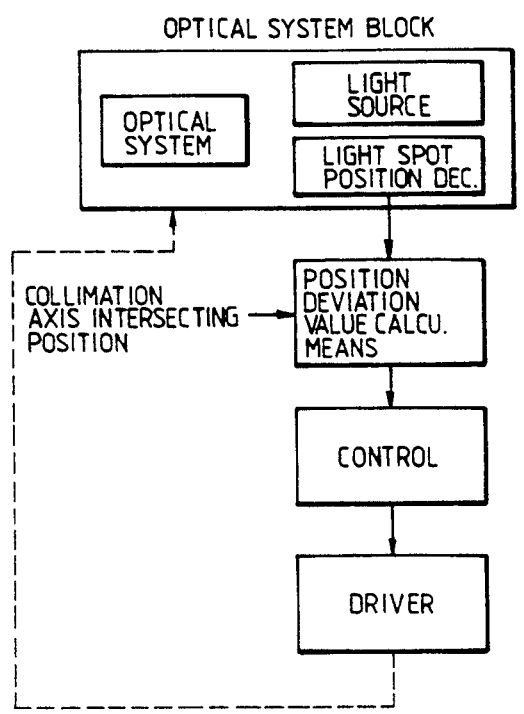
FIG. 1 is a block diagram showing the basic constitution of a first embodiment of the present invention.
Figure 2:
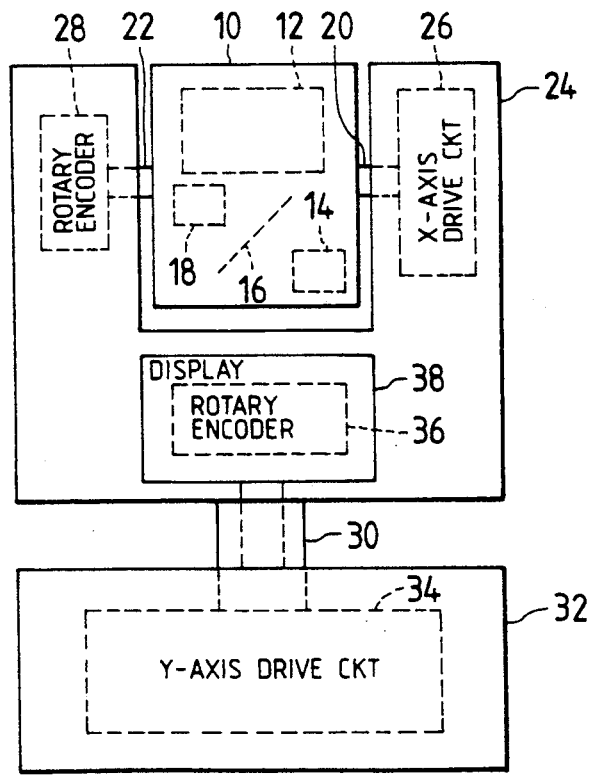

FIG. 2 is a schematic diagram showing a first embodiment of a surveying instrument according to the present invention.

A lens system 12, a light source 14, a half mirror 16 and a light receiving element 18 are accommodated in an optical system block 10.

As shown in FIG. 2, one end of each of rotary shafts 20 and 22 is fixed to sides of the optical system block 10, respectively. The other ends of the shafts 20 and 22 each rotatably mounted to a rotary table 24. The table 24 includes an X-axis rotary driving device 26 and a rotary encoder 28 serving as an angle detector. By means of the X-axis rotary driving device 26, the optical system block 10 is driven to rotate with the rotary shafts 20 and 22. Further, the angle of rotation of the rotary shaft 22 is detected by the rotary encoder 28.

The rotary table 24 is fixed to an upper end of a supporting shaft 30, and the lower end of the supporting shaft 30 is supported rotatably by a Y-axis rotary driving device 34 of a stationary table 32. When the supporting shaft 30 is driven to rotate by the Y-axis rotary driving device 34, the rotary table 24 is rotated with the supporting shaft 30. The rotary table 24 is provided with a rotary encoder 36 as an angle detector so that the rotation angle of the rotary table 24 with respect to the stationary table 32 is detected by the encoder 36.

A display unit 38 is provided to the front face of the rotary table 24. An example of the display unit 38 is an LCD (Liquid Crystal Display) panel which displays the collimation condition or the like that will be described later.

FIG. 3 is a diagram showing an optical system of the optical system block 10.

In the front part of the optical system block 10 there is disposed a lens system 12, and on the collimation axis A (optical axis) in the rear side of the lens system 12 there is arranged a light source 14. The light source 14 is positioned at a focal position of the lens system 12 so that light from the light source 14 is collimated by the lens system 12 to be emitted forward from the lens system 12.

A half mirror 16 is disposed in an optical path between the lens system 12 and the light source 14 crossing the collimation axis A so as to split the optical path for the light reflected by the object and converged by the lens system 12 into two parts.

On the light path split in the upward direction in FIG. 3, there is arranged a light receiving element 18 either in the rear or in the front of the focal point S of the lens system 12. An example of the light receiving element 18 is a position sensor device (PSD) which outputs an electrical signal corresponding to the difference between the central position of the light receiving element 18 and the position G of a light spot (central position of the spot) formed on the element 18, for each of the two orthogonal directions on the light receiving surface.

The lens system 12, light source 14, half mirror 16 and light receiving element 18 can be constructed integrally so that the relative positional relationship therebetween will not change even when the direction of the optical system block 18 is changed, except for the time of position adjustment of the elements.

Here, it is assumed that the intersection of the light receiving element 18 and the collimation axis A' is called the collimation axis intersecting position P and the rectangular coordinates of the positions P and G are called $(X_p, Y_p)$ and $(X_G, Y_G)$, respectively. The position P is stored in advance in an E²PROM after taking an offset into consideration.

Figure 4:
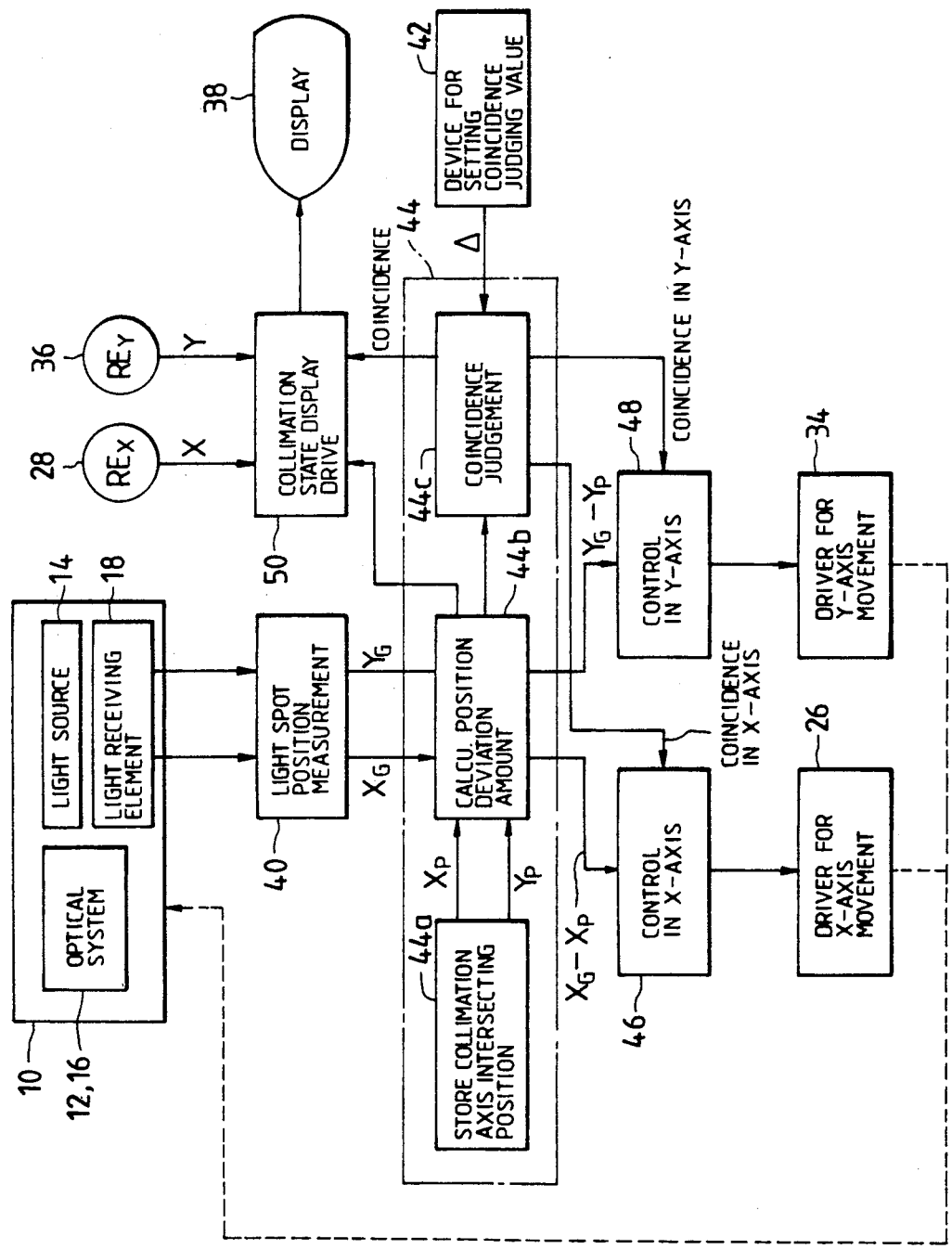
Figure 4A:
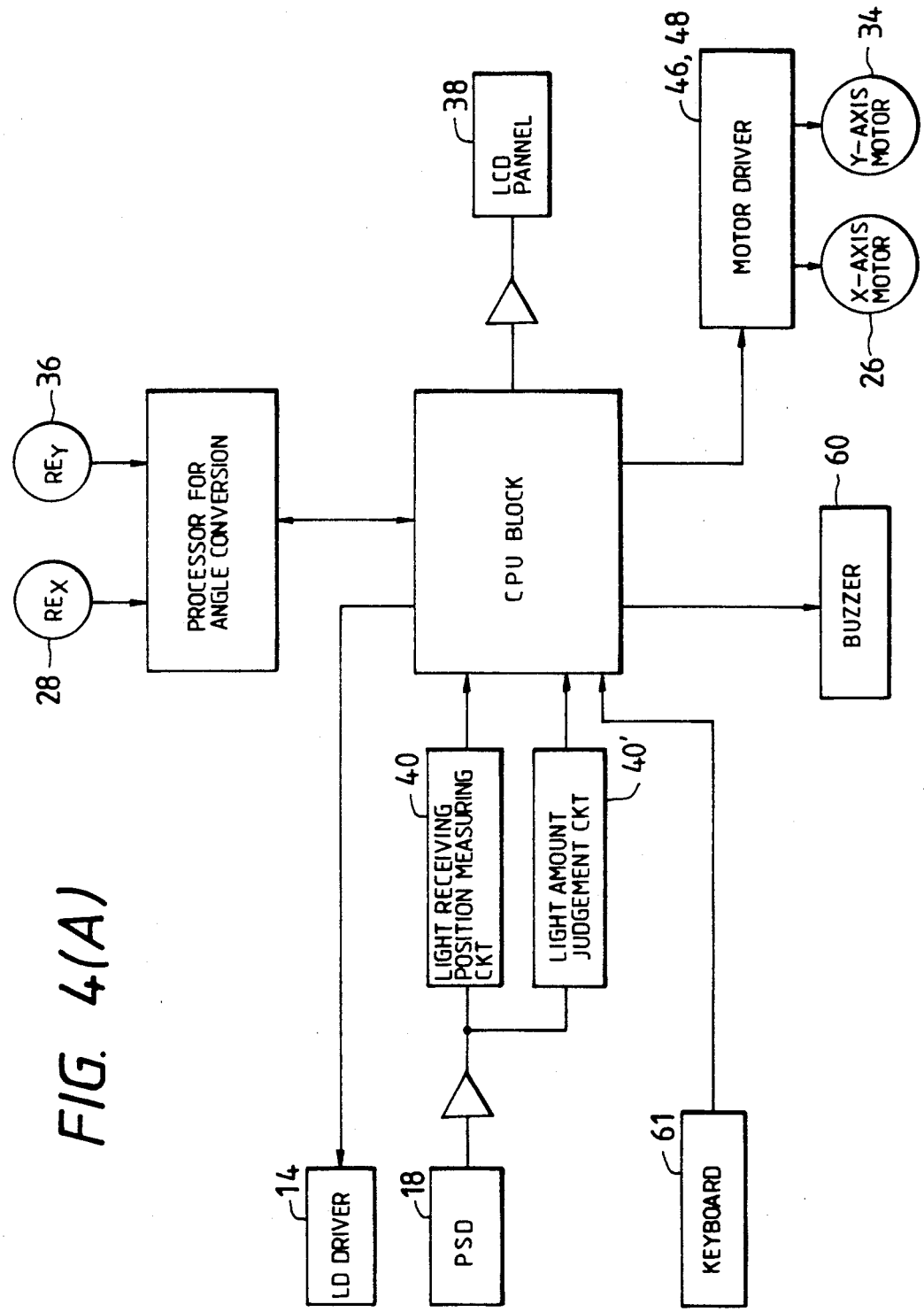
FIG. 4(A) is a block diagram showing hardware of the present surveying instrument.
Figure 4B:
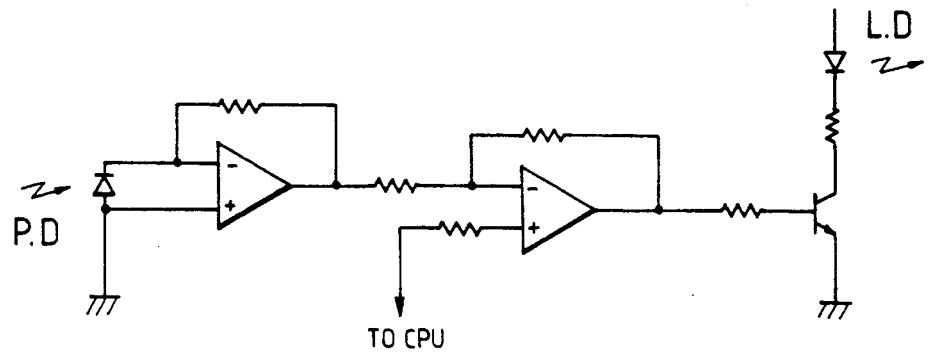
FIG. 4(B) is a diagram showing an example of a light emitting diode drive circuit acting as the light source 14.
Figure 4C:
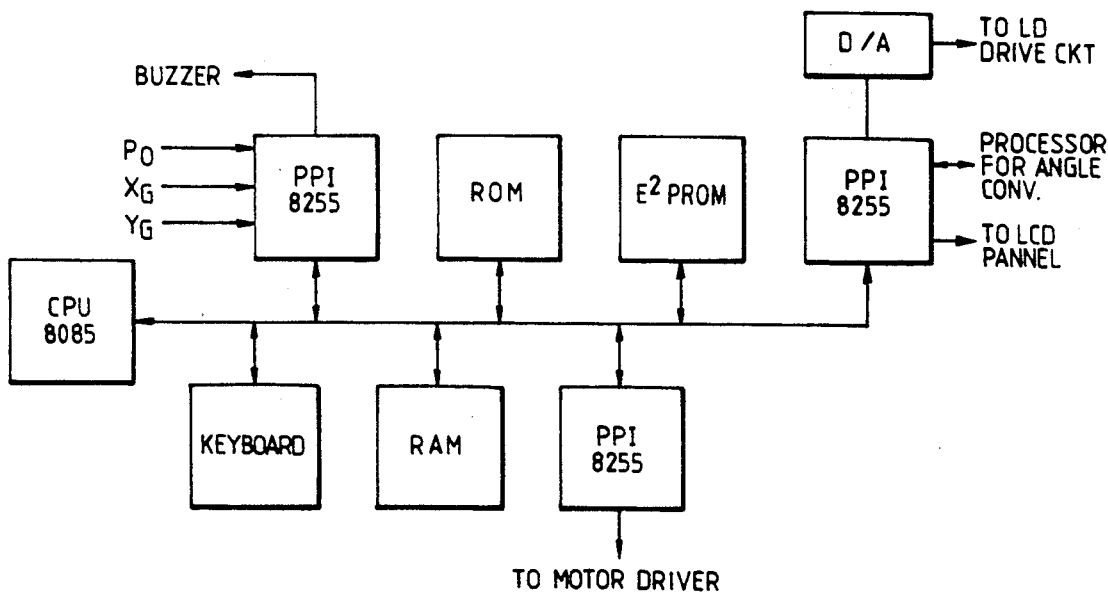
FIG. 4(C) is a block diagram showing a detailed circuit of CPU block shown in FIG. 4(A)
Figure 4E:
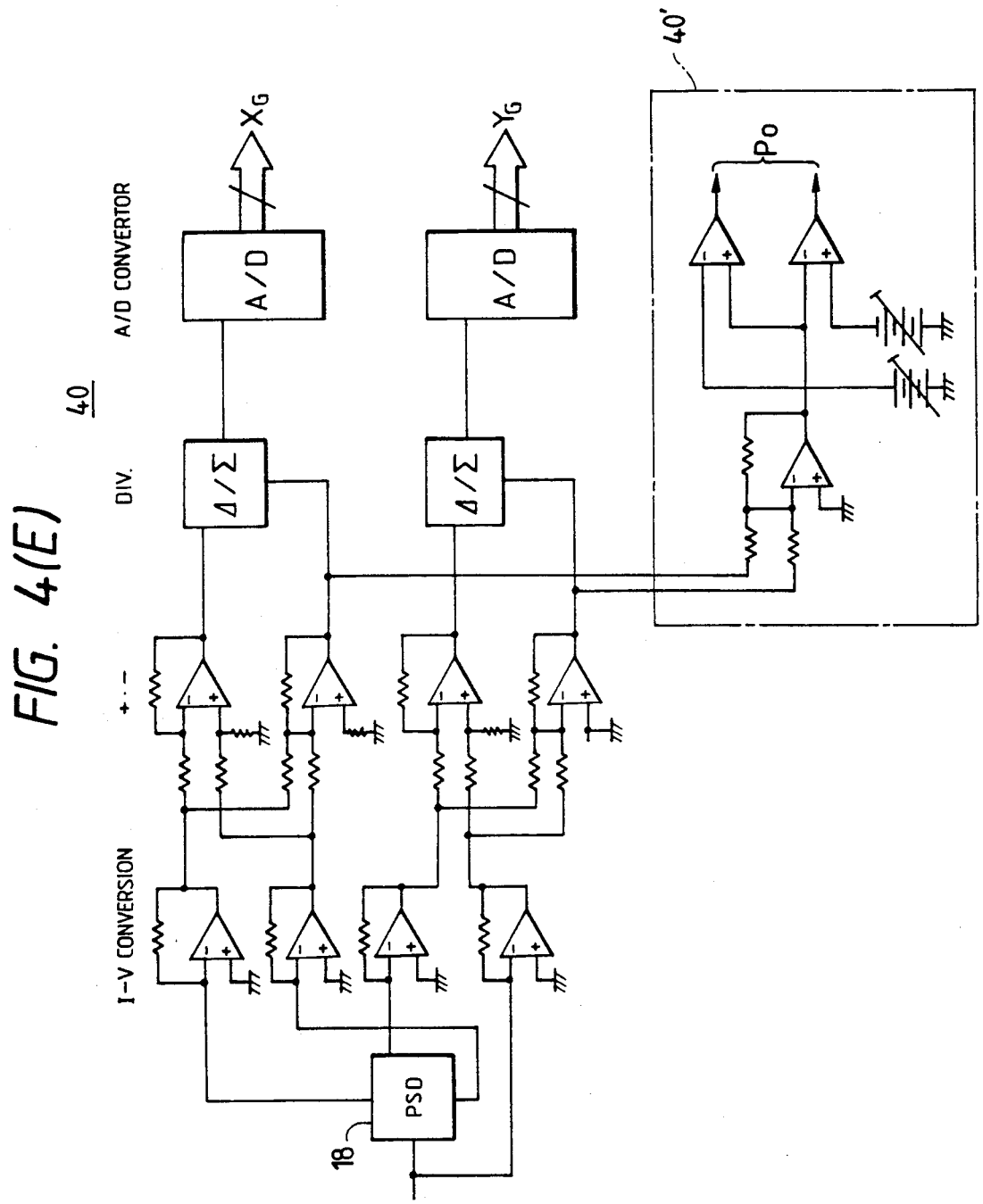
FIG. 4(E) is a circuit diagram showing an example of a light amount judgment circuit in detail.

FIG. 4 is a block diagram showing essential parts of an electrical circuit in the surveying instrument according to the present invention. And FIG. 4(A) is a block diagram showing the hardware of the present surveying instrument, where the same reference numerals are given to the components corresponding to those in FIG. 2 and FIG. 3. FIG. 4(B) is a diagram showing an example of a light emitting diode drive circuit acting as the light source 14 and FIG. 4(C) is a block diagram showing a detailed circuit of a CPU block shown in FIG. 4(A).

Reference numeral 40 designates a light receiving position measuring circuit which receives an output from the light receiving element 18 to produce a digital output representing the light receiving position G $(X_G, X_G)$. The origin of the positional coordinates $X_G$ and $Y_G$ is located at the center of the light receiving element 18. Reference numeral 40' FIG. 4(A) designates a light amount judgment circuit, a detailed circuit of which is shown in FIG. 4 (E).

Reference numeral 42 designates a coincidence detecting value setting circuit which sets a value $\Delta$ to be used for detecting the coincidence between the collimation axis intersecting position P and the light receiving position G. The value $\Delta$ represents an allowable range from the position P as a reference position.

Reference numeral 44 is a microcomputer whose software construction is shown as functional blocks 44a to 44c in FIG. 4.

The block 44a is a collimation axis position storage part where the coordinates $(X_p, Y_p)$ are stored. Both of $X_p$ and $Y_p$ may, for example, be zero.

The block 44b is a positional deviation calculating part which calculates the differences $(X_G-X_P)$ and $(Y_G-Y_P)$.

The block 44c is a coincidence detecting part which detects the coincidence of the X axis if $|X_G-X_P|<\frac{1}{2}\Delta$, and detects the coincidence of the Y axis if $|Y_G-Y_P|<\frac{1}{2}\Delta$.

Reference numeral 46 designates an X-axis control circuit which, upon receipt of the positional deviation $(X_G-X_P)$, controls the X-axis rotary driving device 26 so as to bring the deviation to substantially zero at a speed that is determined according to the value of the deviation, and then stops the device 26 upon receipt of an X-axis coincidence signal.

Reference numeral 48 designates a Y-axis control circuit which, upon receipt of the positional deviation $(Y_G-Y_P)$, controls the Y-axis rotary driving device 34 so as to bring the deviation to substantially zero at a speed that is determined according to the value of the deviation, and then stops the device 34 upon receipt of a Y-axis coincidence signal.

Reference numeral 50 designates a driving circuit for collimation state display, which causes the positional coordinates $(X_G, Y_G)$ and $(X_P, Y_P)$ from the microcomputer 44, coincidence judging value $\Delta$, X-axis coincidence, Y-axis coincidence and the azimuth X and Y from the rotary encoders 28 and 36 to be displayed in the display 38.

Next, an operation of the above described embodiment will be described with reference to FIG. 4(D) showing a flow chart of the present invention.

Prior to the surveying, a corner cube 54 see FIG. 3 is attached to a predetermined position, for instance, at the central position of an object and the data for the position P which has been stored in the E²PROM is read out in a step (1).

Next, the collimation axis is manually directed by a manual mechanism (not shown) toward the corner cube 54, and it is confirmed that the light receiving position G is displayed on the display 38. In addition, a coincidence judging value $\Delta$ is set according to the required degree of coincidence; extent of mechanical vibrations and the like, by operating the coincidence judging value setting unit 42 in a step (2). The coincidence judging value $\Delta$ which has been set in the previous surveying may be stored in a RAM to be employed in the following surveying as a value $\Delta$ and the value $\Delta$ can be renewed if required.

Light beams from the light source 14 are collimated by the lens system 12 to be emitted forward from the optical system block 10. The light beams are then reflected by the corner cube 54 attached to the object, and re-enter into the optical system block 10 via the lens system 12. The beams of light converged by the lens system 12 are reflected by the half mirror 16 and are projected onto the light receiving element 18 as a light spot. In a step (3), it is detected whether a sufficient amount of light beams is received by the light receiving element 18. In this case, if no light spot is formed on the light receiving element 18, as described above, the collimation axis is manually moved so as to form the light spot thereon. Upon completion, an indication is displayed on the display 38. The buzzer 60 is provided to inform the observer of the formation of light spot [step (4)]. Then, the light receiving position $G(X_G, Y_G)$ is displayed on the display 38.

As illustrated in FIG. 5, the distance between the center of the corner cube 54 and the collimation axis A is converted to a deviation of the light receiving position G from the center position P of the light receiving element 18. In a step (5), the deviation is compared with the coincidence judging value $\Delta$. For example, it is judged whether the following expressions are satisfied or not.

$$X_P - \Delta/2 \leq X_G \leq X_P + \Delta/2$$

$$Y_P - \Delta/2 \leq Y_G \leq Y_P + \Delta/2$$

If the above expressions are satisfied, the data that is derived from the rotary encoders 28 and 36 at that time is applied through an angle conversion processor (shown in FIG. 4(A)) to the CPU block to display an elevation angle and a horizontal angle (Step 6).

The positional deviation calculating part 44b calculates this deviation to be supplied to the X-axis control circuit 46 and the Y-axis control circuit 48. Consequently, the X-axis rotary driving circuit 26 and the Y-axis rotary driving circuit 34 are driven to thereby move the collimation axis so as to coincide with the center of the corner cube 54. In other words, the point G on the light receiving element 18 and on the display 38 approaches the point P. In response to this change in the display, each indication on the display 38 changes sequentially. When the point G coincides with the point P, the driving of the optical system block 10 is stopped and the time required for attaining the coincidence is made shorter for the setting of a large coincidence judging value $\Delta$.

In case of "NO" in the step (5), the step is returned through steps (7) and (8) to the step (3). In the step (7), an amount of incoincidence is calculated. In other words, the rotation direction and rotation amount for driver 26 and 34 are obtained, and the control circuits 46 and 48 control the drivers 26 and 34 so as to attain the coincidence (step 8).

Figure 4F:
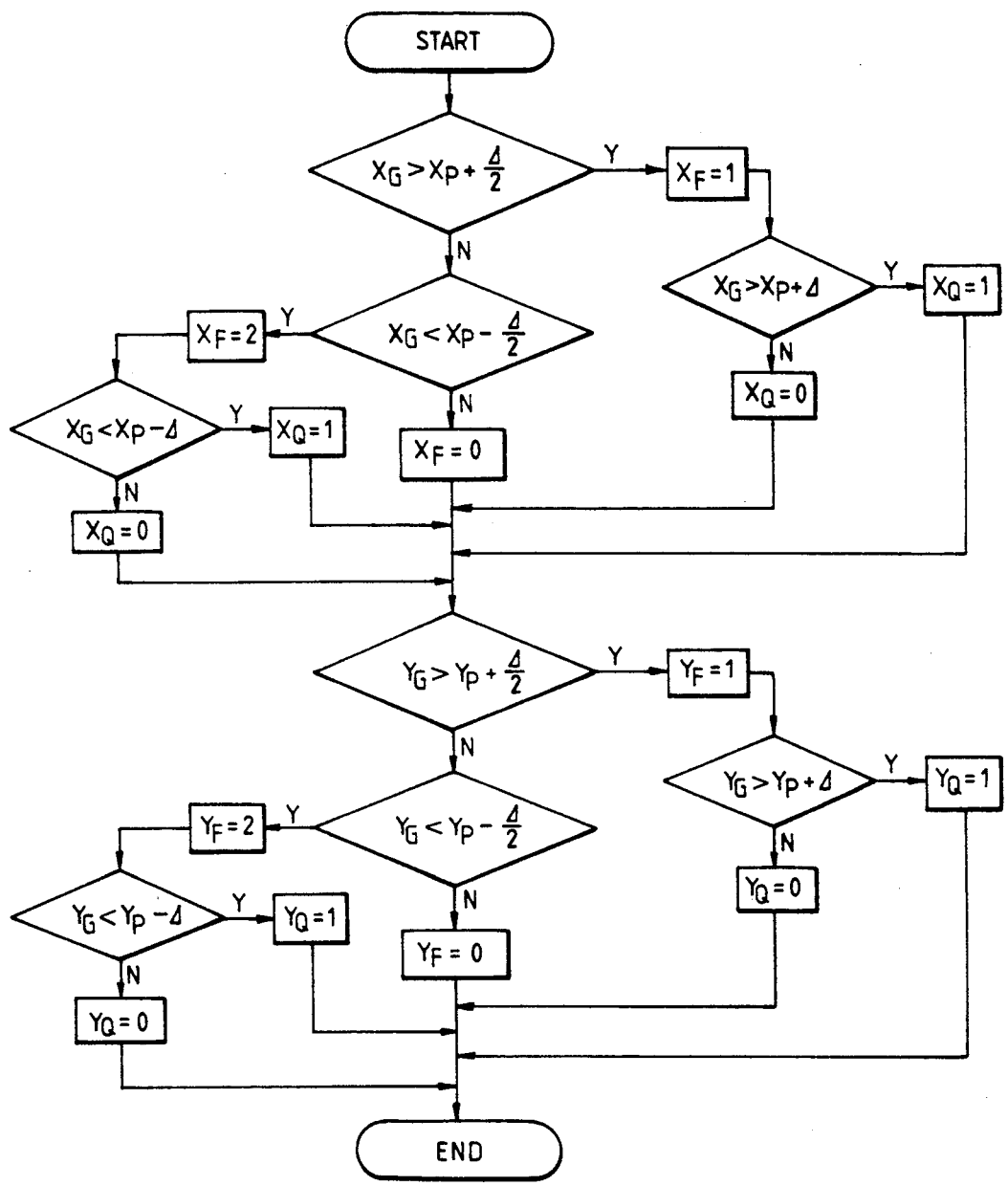
FIG. 4(F) is a flow chart for an example of the control operation of the control circuits 46 and 48.

FIG. 4(F) is a flow chart for an example of the control operation of the control circuits 46 and 48. In FIG. 4(F), reference characters represent the following operations respectively:

$X_F = 0$—Stop the driver 26;

$X_F = 1$—Move the optical system in a clockwise direction;

$X_F = 2$—Move the optical system in a counter-clockwise direction;

$X_Q = 1$—Move the optical system by an amount corresponding to $\Delta$;

$X_Q = 0$—Move the optical system by an amount corresponding to $\Delta/2$;

$Y_E = 0$—Stop the optical driver 34;

$Y_P = 1$—Move the optical system in a clockwise direction;

$Y_F = 2$—Move the optical system in a counter-clockwise direction;

$Y_Q = 1$—Move the optical system by an amount corresponding to $\Delta$; and $Y_Q = 0$—Move the optical system by an amount corresponding to $\Delta/2$.

The operator can find exactly the direction of the corner cube 54, that is, the direction of the object, by reading the azimuth X and Y of the collimation axis that are displayed on the display 38.

The second embodiment of the present invention will be described with reference to FIGS. 6 through 7.

Figure 6A:
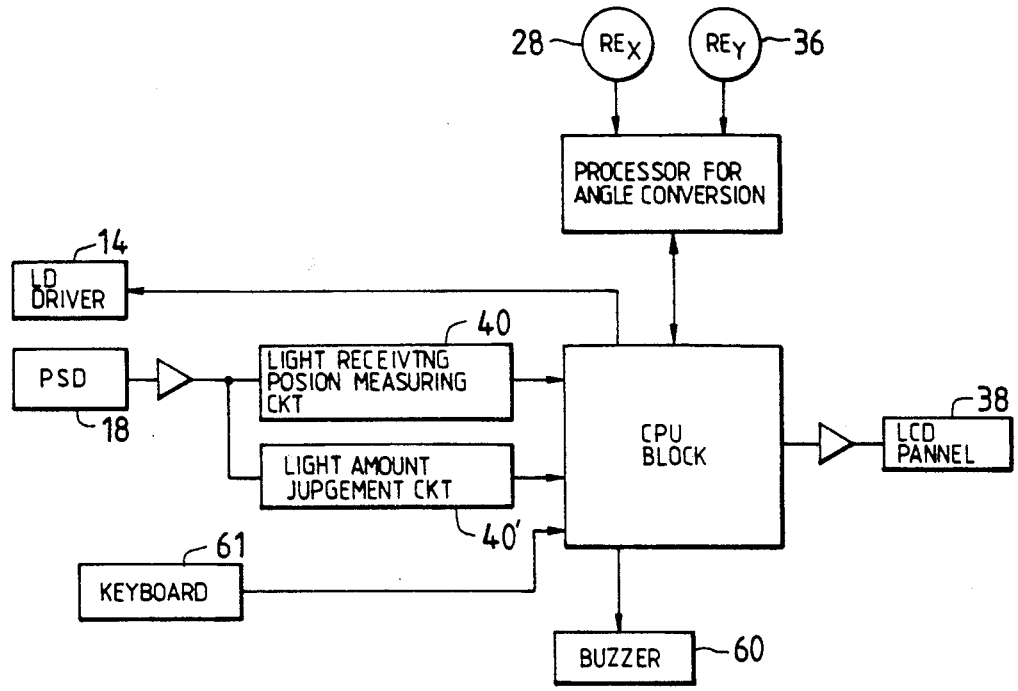
FIG. 6(A) is a block diagram showing hardware of the second embodiment of surveying instrument according to the present invention.
Figure 6B:
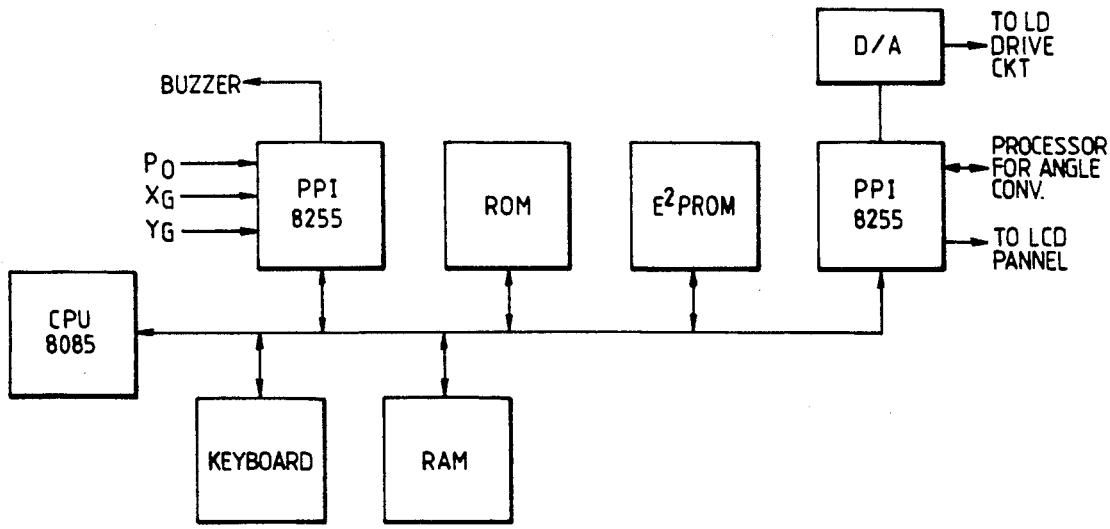
FIG. 6(B) is a block diagram showing a detailed circuit of a CPU block shown in FIG. 6(A)
Figure 6C:
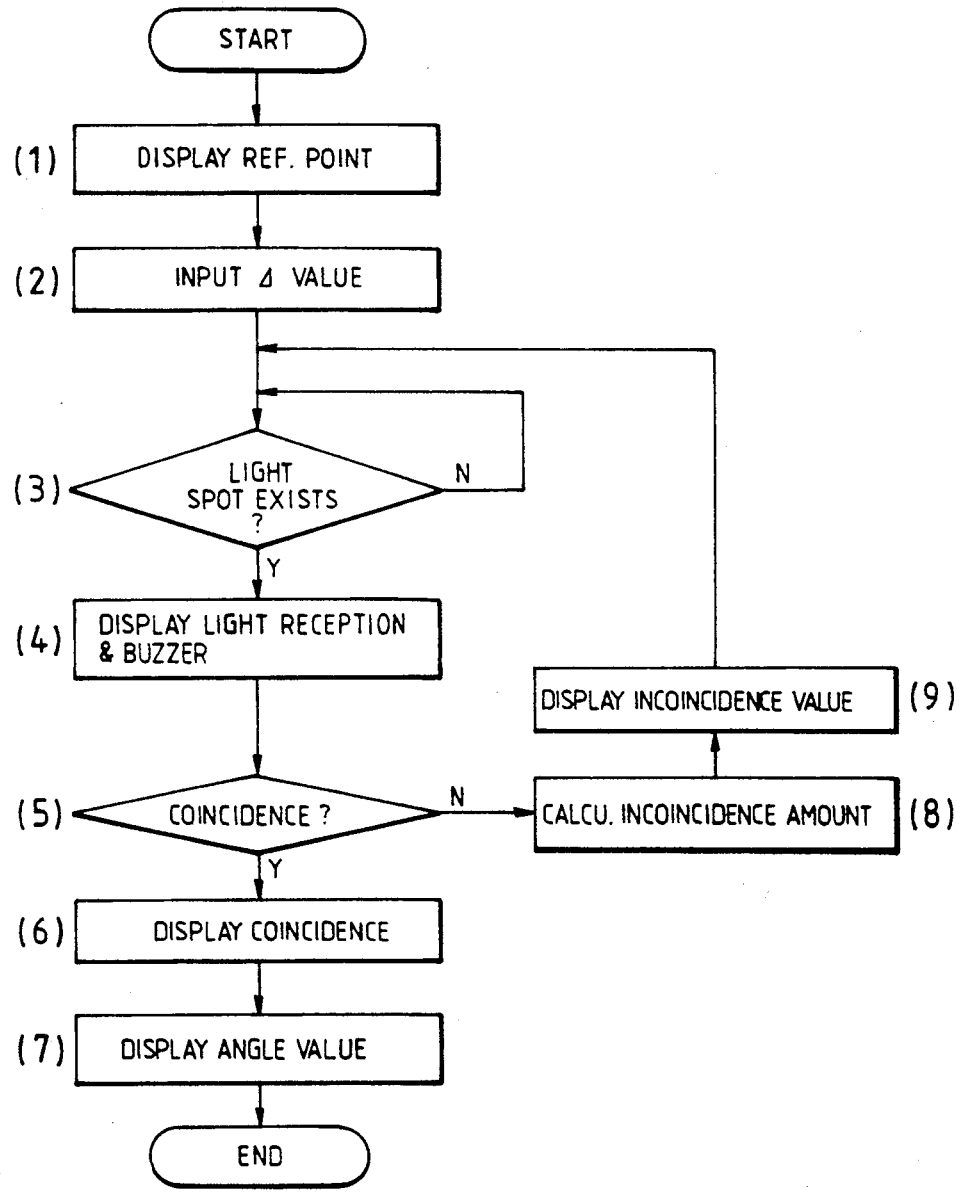
FIG. 6(C) is a flow chart for the operation of the second embodiment.
Figure 6D:
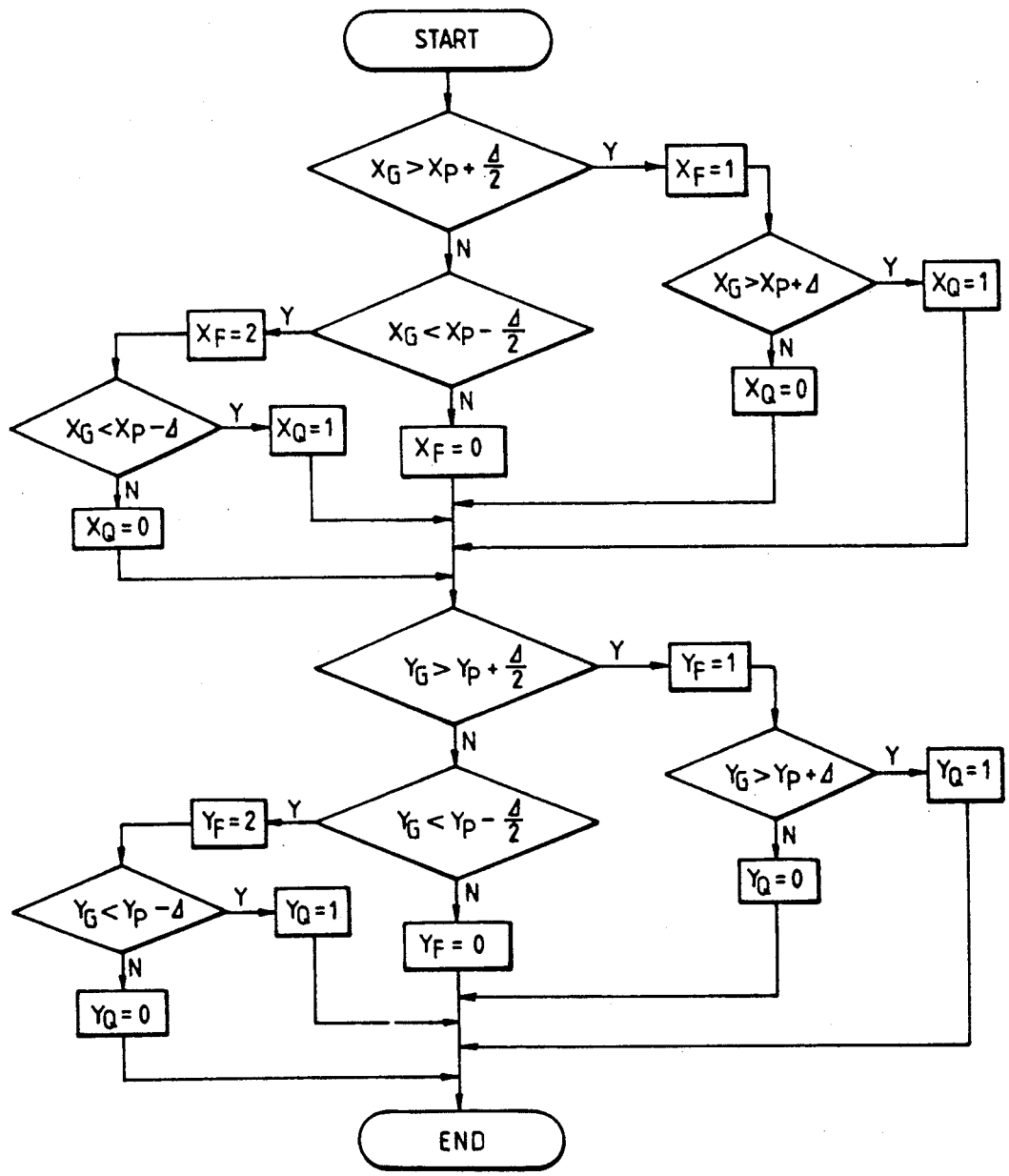
FIG. 6(D) is a flow chart for an example of the control operation of the control circuits.
Figure 8:
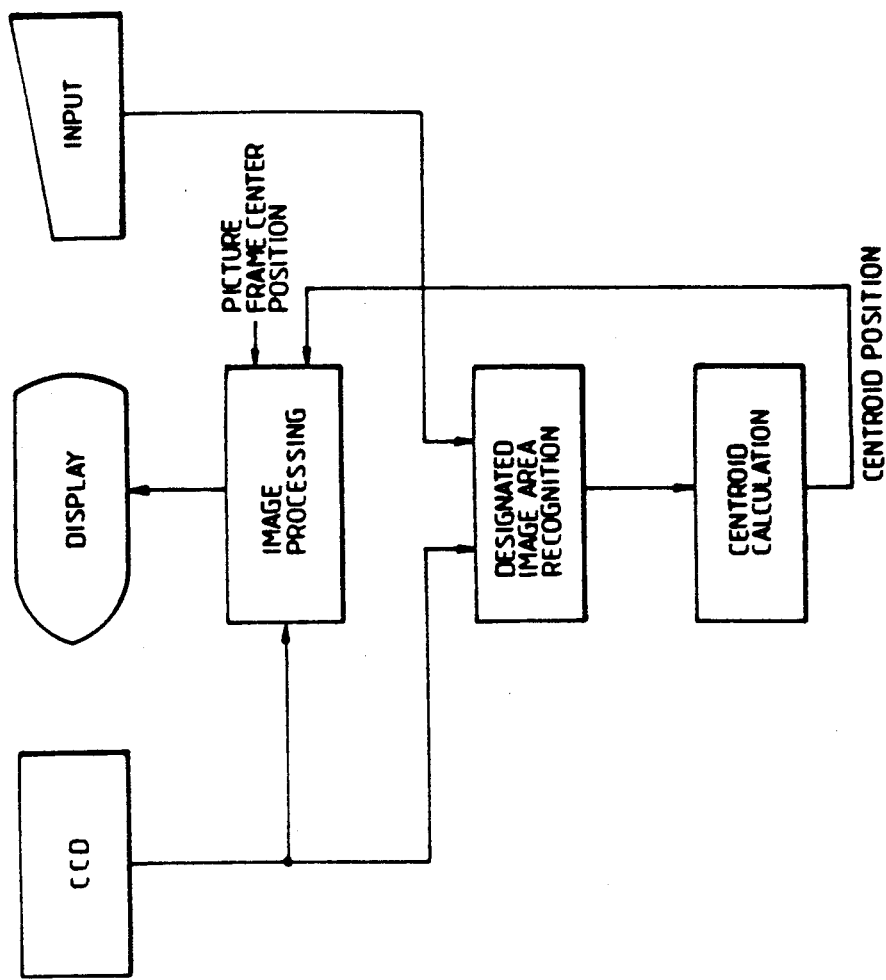
FIG. 8 is a block diagram showing basic features of the present invention.
Figure 7:
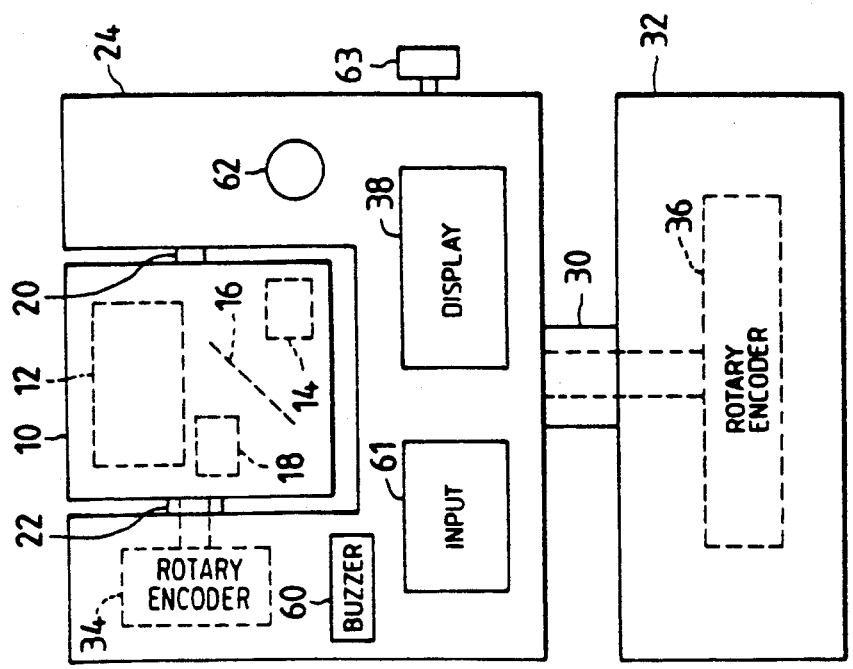
FIG. 7 is a schematic diagram illustrating a front view of the surveying instrument according to the present invention.

As shown in FIGS. 6 through 7, an electronic buzzer 60 and an input unit 61 are provided in addition to the components common to the first embodiment shown in FIG. 2.

In this case, however, since the optical system is manually moved in response to the result of coincidence judgment so that the collimation axis is directed toward an aimed object, the driving circuits 26 and 34 and the control circuits 46 and 48 are removed.

FIG. 6 is a block diagram showing the second embodiment of the present invention where components which are the same as those in FIG. 4 bear the same reference numerals. Examples of the input unit 61 are a track ball, a dizitizer, a keyboard and the like which are used to input data or instructions into the instrument.

FIG. 6(A) is a block diagram showing hardware of the second embodiment of a surveying instrument according to the present invention, where the same reference numerals are given to components corresponding to those in FIG. 4(A). An example of a light emitting diode drive circuit acting as the light source 14 is shown in FIG. 4(B) and a detailed circuit of a CPU block shown in FIG. 6(A) is shown in FIG. 6(B).

In FIG. 6, a light reception detecting unit 44d detects whether a light spot exists thereon or not. Upon detection of the existence of the light spot, the detecting unit 44d starts producing an output signal and continues the production for a certain period of time after the detection.

The electronic buzzer 60 operates to produce an electric sound signal having different sounds representing X-axis coincidence, Y-axis coincidence, and light reception in response to the output of the units 44c and 44d, respectively.

In this embodiment, the driving circuit 50 controls the display 38 to display cross-hairs indicating the positions P and G in response to the input data representing the coordinates ($X_P$, $Y_P$) and ($X_G$, $Y_G$) thereof on the display 38, respectively. Further, the drive circuit 50 also controls the display 38 to display the condition of X-axis coincidence and Y-axis coincidence in response to the outputs from the unit 44c. Furthermore, the azimuth data X and Y are also displayed on the display 38 in response to the output from rotary encoders 28 and 36.

Next, an operation of the above described second embodiment will be described with reference to FIG. 6(c) showing a flow chart of the second embodiment of the present invention.

Prior to the surveying, as in the first embodiment, the corner cube 54 is attached to a predetermined position, for instance, at the central position of an object and the data for the position P which has been stored in the E²PROM is read out in a step (1). On the display 38, the collimation axis intersecting position P is displayed.

Next, the collimational axis is manually directed by a manual mechanism (not shown) toward the corner cube 54, and it is confirmed that the light receiving position G is displayed on the display 38. In addition, a coincidence judging value Δ is set corresponding to the required degree of coincidence, extent of mechanical vibrations and the like, by operating the coincidence judging value setting unit 42 in a step (2). The coincidence judging value Δ which has been set in the previous surveying may be stored in a ROM to be read out in the following surveying as a value Δ. The value Δ can be renewed by the setting unit 42, if required.

Light beams from the light source 14 are collimated by the lens system 12 to be emitted forward from the optical system block 10. The light beams are then reflected by the corner cube 54 attached to the object, and re-enter into the optical system block 10 via the lens system 12. The beams of light converged by the lens system 12 are reflected by the half mirror 16 to be projected onto the light receiving element 18 as a light spot. In a step (3), it is detected whether a sufficient amount of light is received by the light receiving element 18. In this case, the electronic buzzer 60 produces an intermittent sound, for instance, which represents that the light spot is on the element 18, and the received light spot position G ($X_G$, $Y_G$) is displayed on the display 38, so that the observer can recognize that the object is now in a view of the optical system (step 4). If the light quantity is too large, the CPU controls the LD drive circuit to adjust the light quantity. If no light spot is formed on the light receiving element 18, as described above, the collimation axis is manually moved so as to form the light spot thereon.

As illustrated in FIG. 5, the distance between the center of the corner cube 54 and the collimation axis A is converted to a deviation of the point G from the point P on the light receiving element 18.

In a step (5), the deviation is compared with the coincidence judging value Δ. For example, it is judged whether the following expressions are satisfied or not.

$$X_P - \Delta/2 \leq X_G \leq X_P + \Delta/2$$

$$Y_P - \Delta/2 \leq Y_G \leq Y_P + \Delta/2$$

If the above expressions are satisfied, the electronic buzzer 60 is caused to produce a sound signal representing the coincidence with respect to both X and Y coordinates and some indication is displayed at the point P on the display 38 in a step (6). Further, the data that are derived from the rotary encoders 28 and 36 at that time, are applied through an angle conversion processor (shown in FIG. 6(A)) to the CPU block to display an elevation angle and a horizontal angle (Step 7).

In case of "NO" in the step (5), the step is returned through steps (8) and (9) to the step (3). In the step (8), an amount of incoincidence is calculated. In other words, the rotation direction and rotation amount for the X-axis and Y-axis fine rotation adjustment dials 62 and 63 FIG. 2 are obtained to be displayed.

FIG. 6(D) is a flow chart for an example of the calculation operation in the step (8). In FIG. 6(D), reference characters represent the following operations respectively:

$X_F = 0$—Stop the driver 26;

$X_F = 1$—Move the optical system in a clockwise direction;

$X_F = 2$—Move the optical system in a counter-clockwise direction;

$X_Q = 1$—Move the optical system by an amount corresponding to Δ;

$X_Q = 0$—Move the optical system by an amount corresponding to Δ/2;

$Y_E = 0$—Stop the optical driver 34;

$Y_F = 1$—Move the optical system in a clockwise direction;

$Y_F = 2$—Move the optical system in a counter-clockwise direction;

$Y_Q = 1$—Move the optical system by an amount corresponding to Δ; and $Y_Q = 0$—Move the optical system by an amount corresponding to Δ/2.

In the step (9), the rotation direction and amount which are obtained in the step (8) are displayed on the display 38. The following is an example of such indications on the display 38.

X=O—Coincidence in X-axis direction;

X=R—Move the optical system in a clockwise direction;

X=L—Move the optical system in a counter-clockwise direction;

F—Movement of an amount corresponding to Δ in X-axis direction;

S—Movement of an amount corresponding to Δ/2 in X-axis direction;

Y=O—Coincidence in Y-axis direction;

Y=R—Move the optical system in a clockwise direction;

Y=L—Move the optical system in a counter-clockwise direction;

F—Movement of an amount corresponding to Δ in Y-axis direction;

S—Movement of an amount corresponding to Δ/2 in Y-axis direction;

As the observer watches the display 38, the observer actuates an X-axis fine rotation adjustment dial 62 and a Y-axis fine rotation adjustment dial 63 so that the position G on the display 38 coincides with the position P. In response to the actuation of the dials 62 and 63, the driving devices 28 and 36 are operated to move the collimation axis A to coincide with the center of the corner cube 54. Consequently, the point G approaches the point P on the display 38. When either the X coordinate or the Y coordinate of the point G becomes within an allowable range of the coincidence judging value Δ from the X coordinate and the Y coordinate of the point P, the electronic buzzer 60 starts producing the sound indication, and then the approximate coincidence is also displayed on the display 38. In response to this, the observer stops the actuation of the dial by actuation of which the coincidence is obtained. The further actuation of the remaining dial is carried out until the same approximate coincidence is obtained. The period of time that is required to accomplish the coincidence of the point G and P becomes smaller for the setting of larger coincidence judging value Δ.

The observer can find exactly the direction of the corner cube 54, that is, the direction of the object, by reading the azimuth X and Y of the collimation axis that are displayed on the display 38.

It should be noted that various modifications of the present invention are possible without departing from the basic concept of the present invention.

For instance, the light receiving element may be an image sensor.

Further, in place of the optical system 12, a catoptric system, such as that of Cassegrain type, can be used.

Moreover, the light receiving position, that is light spot position G obtained by collimation to the object may be written into the memory as the collimation axis intersecting position P. In addition, instead of the collimation axis intersecting position storage part 44a, a collimation axis intersecting position setting unit may be used to carry out the position setting so as to make an offset of the collimation axis zero.

Furthermore, while the light source 14 is disposed at the focal position of the optical system 12 in the above described embodiment, the light source 14 may be arranged slightly closer to the lens system 12 so as to emit diverging beams from the lens system 12 to thereby broaden the search area of the corner cube 54. In this case, the initial setting of the surveying instrument can be made easier. Further, as the point G approaches the point P, smaller diverging angle of the diverging beams may be chosen and the power supplied to the light source 14 is also reduced.

Figure 9:
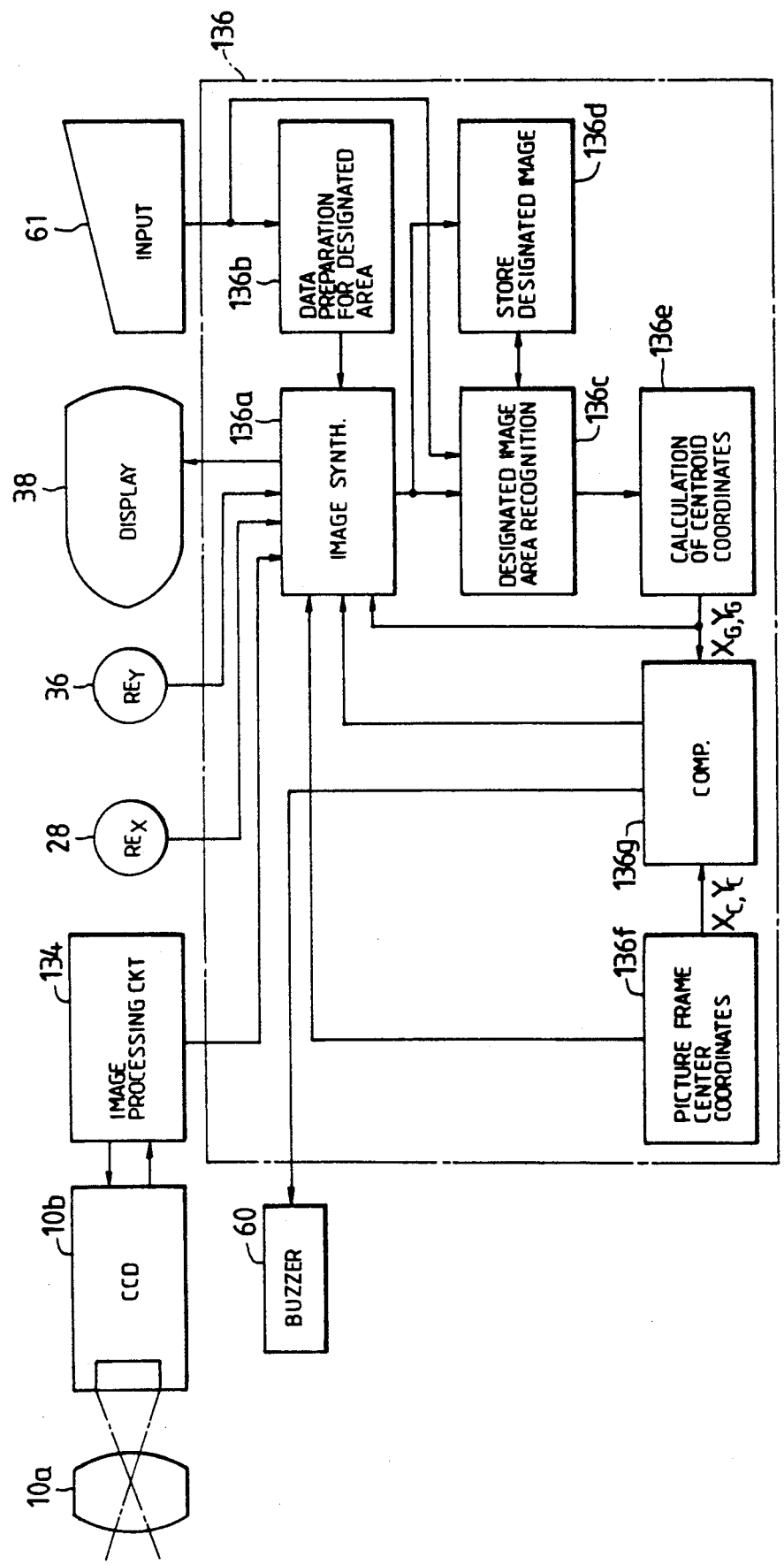
FIG. 9 is a block diagram showing a third embodiment of the present invention.
Figure 9A:
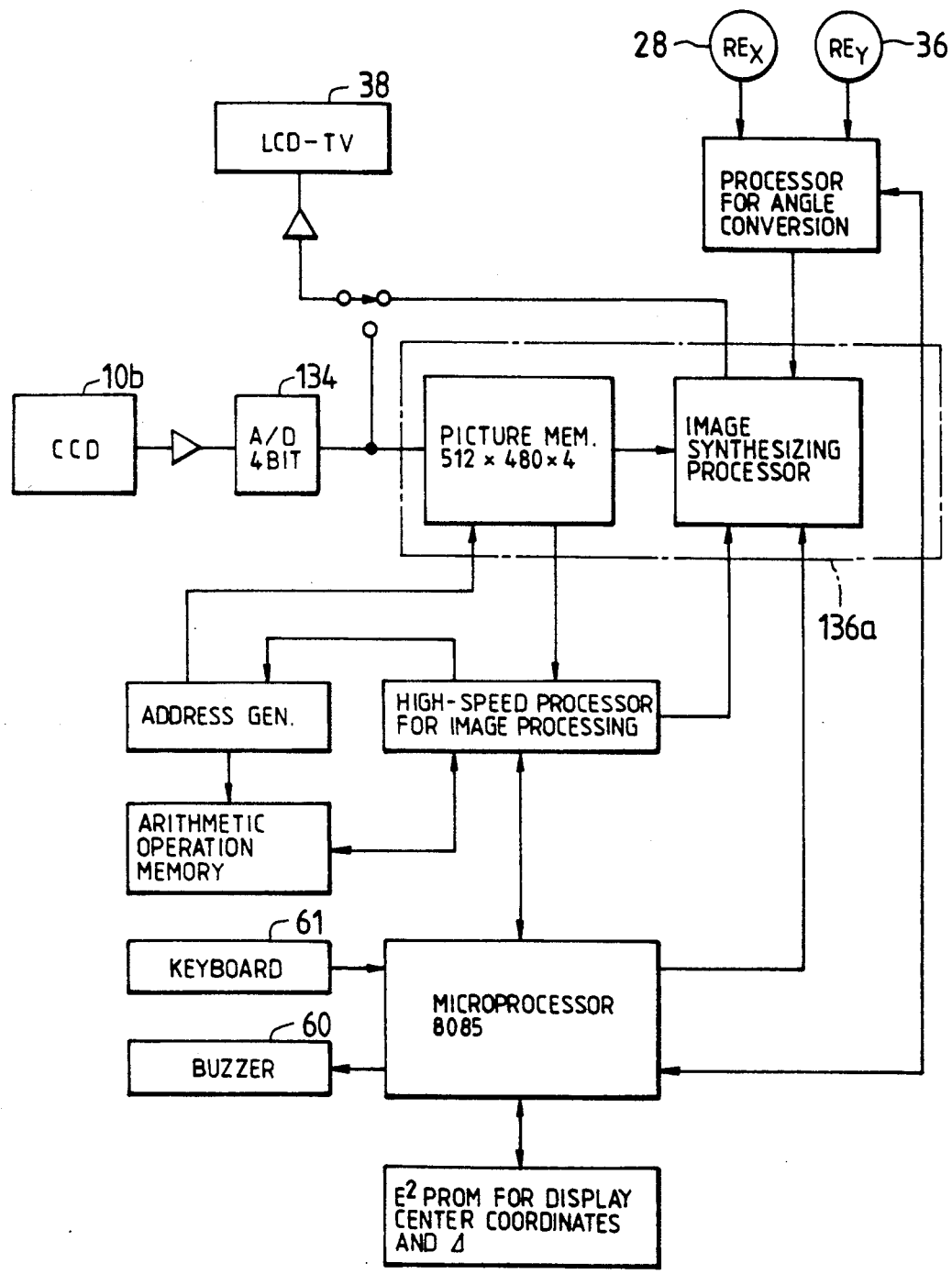
FIG. 9(A) is also block diagram of a hardware of the third embodiment.
Figure 9B:
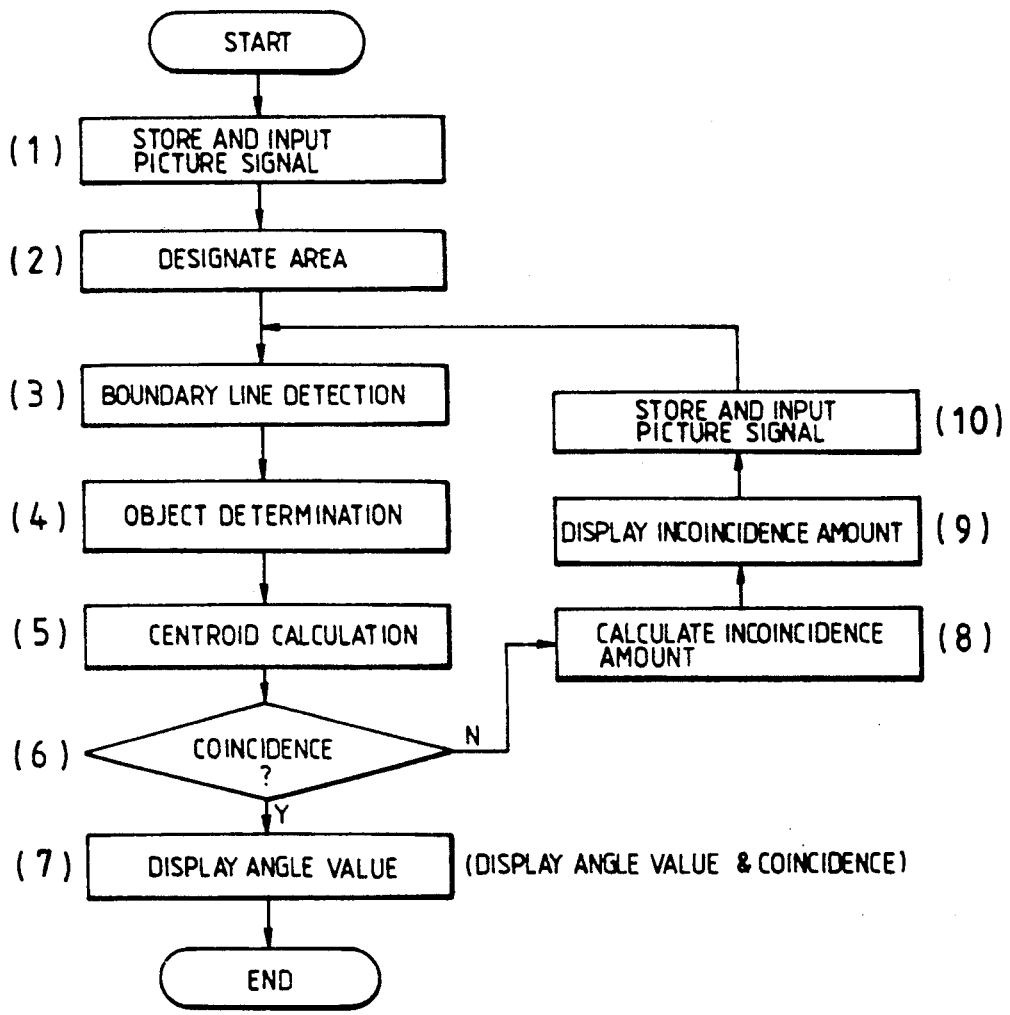
FIG. 9(B) is a flow chart for the operation of the third embodiment.

FIG. 9 is a block diagram showing a third embodiment of the present invention, and FIG. 9(A) is also the block diagram of a hardware of the third embodiment. FIG. 9(B) is a flow chart for the operation of the third embodiment.

In FIG. 9, a telescope 10 comprises an optical system 10a and a solid-state images pickup element 10b, and the image of an object on the direction of an optical axis of the optical system 10a is formed on an image pickup plane of the solid-state image pickup element 10b. The center of the image pickup plane lies on the optical axis of the optical system 10a, namely, on the optical axis of the telescope 10.

The telescope 10 is rotatably mounted to the stationary table 24 in the same manner as that shown in FIGS. 2 and 7. Provided on the rotary table 24 is an X-axis fine adjustment dial 62 by the turning of which it is possible to move the telescope 10 with the rotary shafts 20 and 22 as the center. There is provided the rotary encoder 34 in the rotary table 24 to detect the rotation angle of the rotary shaft 22.

The rotary table 24 is supported rotatably by a stationary table 32 via the supporting shaft 30. By turning the Y-axis fine adjustment dial 63 provided to the rotary table 24, it is possible to move the rotary table 24 with the supporting shaft 30 as the center with respect to the stationary table 32. In the stationary table 32 there is provided a rotary encoder 36 which detects the rotation angle of the rotary table 24 with respect to the stationary table 32.

On the front face of the rotary table 24 there are also provided the display 38, the input unit 61 and the electronic buzzer 60. The display 38 is an LCD, for example, which displays the image picked up by the solid-state image pickup element 10b. The center position of the display surface of the display 38 corresponds to the center position of the image pickup surface of the solid-state image pickup element 10b. As described above, the input unit 61 is, for example, a track ball, digitizer or keyboard, which is used to input data and instructions for moving a cursor displayed on the display 38 in order to designate a specific image. Further, the electronic buzzer 60 is used to inform the observer that the collimation for the object is completed.

The operation of designation of the specific image on the display 38 will be described with reference to FIG. 11 which illustrates an example of a picture on the display 38 where three images are partitioned in the picture, for example, with three boundary lines $BL_1$, $BL_2$ and $BL_3$. The following is the case of designating an image partitioned by the boundary line $BL_1$.

In FIGS. 9 and 9(A), the same components as those in FIGS. 4 and 6 bear the same reference numerals. Reference numeral 134 designates an image processing circuit which outputs a digital video signal obtained by processing picture element signals from the solid-state image pickup element 10b; and 136, an image processor including a microcomputer. In FIG. 9, the software of the microcomputer is shown briefly by the use of function blocks 136a through 136g.

Reference numeral 136a denotes an image synthesizing part. A picture memory and an image synthesizing PROCESSOR correspond to this part 136a. The image synthesizing part 136a stores a digital video signal supplied from the image processing circuit 134, and superposes onto the picture displayed on the display 38 azimuth data supplied from the rotary encoders 28 and 36, a designated area, the boundary line of a designated image, cross hairs indicating the geometric optical center of gravity centroid of the designated image, cross hairs indicating the center position of the display and the like that will be described later.

Reference numeral 136b denotes a display data preparation part for the designated area. The observer actuates the input unit 61 to move the cursor on the display 38 to designate either points A and C or B and D shown in FIG. 9(c), so that the coordinates of either the points A and C or B and D are stored in a memory. The part 136b prepares data necessary for displaying a rectangle ABCD that has the segment AC or BD as its diagonal based on such stored data. The data thus prepared is supplied to the image synthesizing part 136a. The image synthesizing part 136a operates to superpose the rectangle ABCD in the picture displayed on the display 38 according to the data thus supplied. As a result, the rectangle ABCD is displayed on the display 38, permitting the observer to confirm that the area is designated.

Reference numeral 136c denotes a recognizing part for the designated area. This unit judges the boundary of the image within the designated area based on the image data applied from the image synthesizing part 136a and the data representing the area that is designated by the use of the input unit 61 in order to recognize a boundary line $BL_1$. That is, the area (area of a designated image) surrounded by the boundary line $BL_1$ is recognized. Further, this unit 136c can also recognize the boundary line $BL_1$ even during the motion of the designated image, as will be described later.

Reference numeral 136d denotes a designated image storage part which stores the data of images within the designated image area recognized by the designated area recognizing part 136c in the image data supplied from the image synthesizing part 136a. The part 136d stores characteristic data on the boundary line $BL_1$ such as a change in brightness. Therefore, the designated area recognizing part 136c can recognize the boundary line $BL_1$ quickly and accurately based on the comparison result of data from the designated image storage part 136d and data from the image synthesizing part 136a even when the designated image moves.

Reference numeral 136e denotes a centroid coordinates calculating part which calculates the coordinates $(X_G, Y_G)$ of the geometric optical center of gravity $P_G$ of a designated image area recognized by the designated area recognizing part 136c. The centroid coordinates are supplied to the image synthesizing part 136a where the data for the cross hairs whose center corresponds to the geometric optical center of gravity $P_G$ is prepared so that the cross hairs are superposed onto the picture displayed on the display 38. Accordingly, the centroid of the designated image is displayed on the display 30 by the cross hairs.

Reference numeral 136f is a display center coordinates storage part which stores the coordinates $(X_C, Y_C)$ of the display center $P_C$ of the display 38. The display center coordinates are supplied to the image synthesizing part 136a, where the data for cross hairs the intersection of which corresponds to the display center is prepared so that the cross hairs are superposed onto the picture on the display 38. Accordingly, the screen center is displayed by the cross hairs on the display 38.

Reference numeral 136g designates a comparison part. This part 136g judges whether the centroid $P_G$ of the designated image coincides with the center $P_C$ of the display approximately, that is, whether the values for $X_C$ and $X_G$ and the values for $Y_C$ and $Y_G$ substantially coincide with respect to each other. If the approximate coincidence is accomplished, then the degree of coincidence, for instance, the distance between the points $P_G$ and $P_C$ on the display is calculated to be applied to the image synthesizing part 136a. At the same time when the approximate coincidence is accomplished, the comparison part 136g produces an output signal to the electronic buzzer 60 to produce a sound signal to inform the observer of the approximate coincidence. Upon the judgement of the approximate coincidence, the image synthesizing part 136a synthesizes data which indicates the coincidence between both positions to be displayed on the display 38. The data may cause data for the cross hairs on the display 38 to blink. Further, the degree of coincidence is displayed by means of a numerical value, symbol, color of the cross hairs or the like.

Next, an operation of the third embodiment of the present invention will be described with reference to FIG. 9 (B).

A picture which is obtained by superposing both a numerical value indication indicating the azimuth of the telescope 10 and the cross hairs showing the position $P_C$ of the display center onto a picture in the axial direction of the telescope 10 is displayed on the display 38 (a step 1). The observer directs the axis of the telescope 10 to an object, and after confirming that an image of the object is formed on the display 38, the operator actuates the input unit 61 to designate the opposing vertices either A and C or B and D of the area ABCD in which the object is contained as shown in FIG. (c). The frame line of the area ABCD is displayed on the display 38 (step 2).

If the observer judges it to be an appropriate area, he inputs confirmation by operating the input unit 61. Upon inputting of that signal, the frame line of the ABCD goes out of the display, and the boundary line $BL_1$ is displayed on the display 38 (steps 3 and 4). Then, the position of the centroid of the area surrounded by the boundary line $BL_1$ is indicated by the cross hairs on the display 38 (step 5).

While watching the display 38, the observer brings the designated image centroid position $P_G$ and the screen center position $P_C$ into coincidence by turning the X-axis fine adjustment dial 62 and the Y-axis fine adjustment dial 63 (step 6). When the approximate coincidence between the two positions is accomplished, the indication sound of the electronic buzzer 60 is produced. Simultaneously, the cross hairs and in the display 38 to blink the degree of the coincidence is also displayed thereon. In the case where the coincidence becomes adequate, the observer stops the operation and takes the reading of the azimuth (azimuth of the collimation axis) of the telescope displayed on the display 38 (step 7).

Since both the approximate coincidence of the two positions and the degree of coincidence can be displayed, the work required for collimating can be made easy. In addition, the collimation can be facilitated even if there is a flicker due to variation in temperature of the air in the collimation direction.

The operation of the third embodiment of the present invention will be described in more detail with reference to FIGS. 9(A) to 9(L).

Figure 9C:
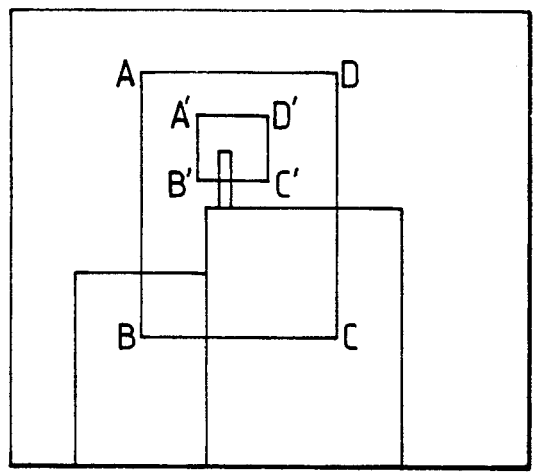
FIG. 9(C) to 9(J) are explanatory diagrams for boundary recognition operation.

In the step (1), an output signal from the CCD is converted to picture element signals each having 16 gradations, and the picture element signals are stored in the picture memory. On the other hand, the picture element signals are also applied to the LCD for monitoring where a picture in a direction to which the telescope 10a is directed, is displayed. The observer adjusts the telescope 10a by actuating the dials 62 and 63 until the aimed object is placed within the view of the telescope 10a, that is, until the aimed object is displayed on the LCD as shown in FIG. 9(C).

In the step (2), the observer inputs by using the keyboard 61 data for the positions of the opposing vertices either A and C or B and D to designate an area including the aimed object. At the same time, the observer also inputs data representing the Δ value, if change thereof is required. It is well known in the art that it is possible to obtain all coordinates A, B, C and D from the input coordinates of either A and C or B and D.

Figure 9D:
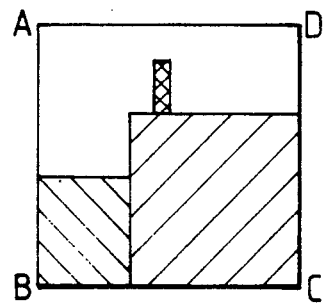
Figure 9G:
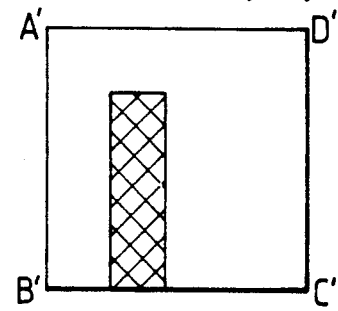
Figure 9E:
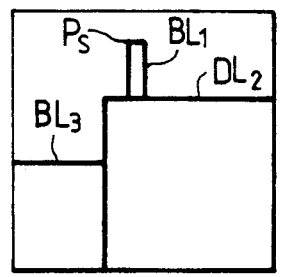
Figure 9H:
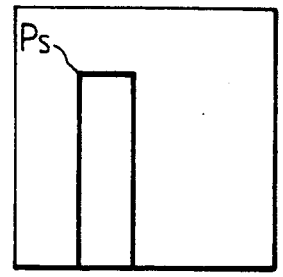

In the step (3), the area ABCD which has been determined in the step (2) is set and displayed on the display 38 as shown in FIG. 9(D), and output signals from the picture elements contained in the designated area ABCD are subjected to secondary differential processing in order to detect a boundary line $BL_1$. The detected boundary line $BL_1$ is expressed and displayed by black-and-white pattern as shown in FIG. 9(E). A point is then detected which is located at an uppermost and left side of the black-and-white pattern as an initial point by way of scanning horizontally from the left side of each scanning line. The initial point Ps is detected by detecting the first variation from white to black.

Figure 9F:
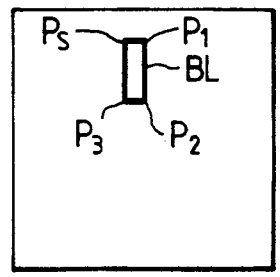

Subsequently, a closed boundary from the point Ps is recognized by way of examining data for eight points surrounding the point Ps in the following manner. FIG. 9(J) is an explanatory diagram showing such an examination of data for the eight points. First, the examination is carried out from the point Ps in a clockwise direction. That is, the continuous boundary line to the right direction is recognized by following the black point. The recognition operation is repeatedly achieved until the white point first occurs as shown in FIG. 9(J). Then, it is detected whether there occurs black points in a downward direction. If there are, the recognition operation is repeatedly achieved in the downward direction and such a recognition operation is repeatedly carried out in the clockwise direction to the initial point Ps. If it is possible to return to the initial point Ps, the detected boundary line is regarded as a closed boundary line which is to be designated in the surveying. In FIGS. 9(E) and 9(F), the object surrounded by the boundary line $BL_1$ is the closed boundary line to be designated. During the recognition, all coordinates of boundary points Ps, $P_1$, $P_2$ and $P_3$ are stored in an arithmetic operation memory.

Figure 9I:
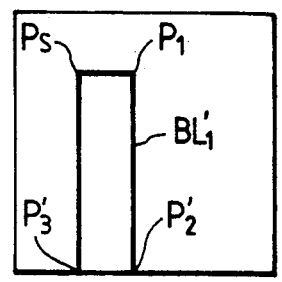
Figure 9J:
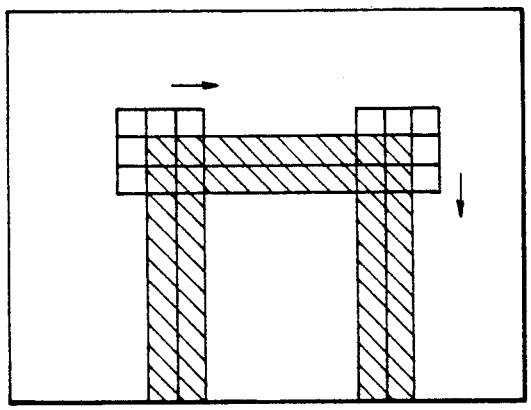

During the recognition of the boundary line, for example, assuming that the boundary line extends to the picture frame at the point $P_2$ as shown in FIG. 9(I), the operation is returned to the initial position Ps, and the recognition operation starts in the counterclockwise direction. When the boundary line extends to the picture frame at the point $P_3$ again, it is confirmed whether the picture frame is the same as that of the previous recognition. If it is the same, the object Ps, $P_1$, $P_2$ and $P_3$, surrounded by the boundary line $BL_1$ which includes some part of the picture frame is the closed boundary line to be designated. If it is not the same, the recognition is incomplete, and then the area designation is carried out again under object recognition flag F being zero.

In the case where the flag F is 0, indications such as "0" representing that the object is not recognized are displayed at all corners on the boundary line on the display. In this case, if the observer judges that the object surrounded by the boundary line is in the aimed object, the observer inputs "YES" to complete the recognition operation. On the other hand, if the object is not the aimed object, the operation in the step (2) is repeated until the aimed object is the designated object.

When "YES" is input, every at least two segment components of the boundary line $BL_1$ in the X and Y directions are calculated to be stored in the following processing. Further, based on the coordinate data points in the vicinity of the corner points on the boundary line, the data of the corner points including the difference in level is also calculated to be stored. In this case, the flag F turned to "1" and the operation advances to the following step 5 where the geometric optical center of the object is calculated. The sampling of the object is also carried out using the data in the step (2). More specifically, an area corresponding to the object for the data is subjected to binary coding representing the black-and-white pattern and the boundary line thereof is also carried out in the same manner as the step (3). In this case since the size and configuration of the object have been known, it is automatically possible to detect the extending direction during the corner points on the boundary line. In case it is somewhat difficult to recognize the corner points of the boundary line of the object due to the degrading in various circumstances, the recognition is accomplished according to data which has been stored.

Figure 9K:
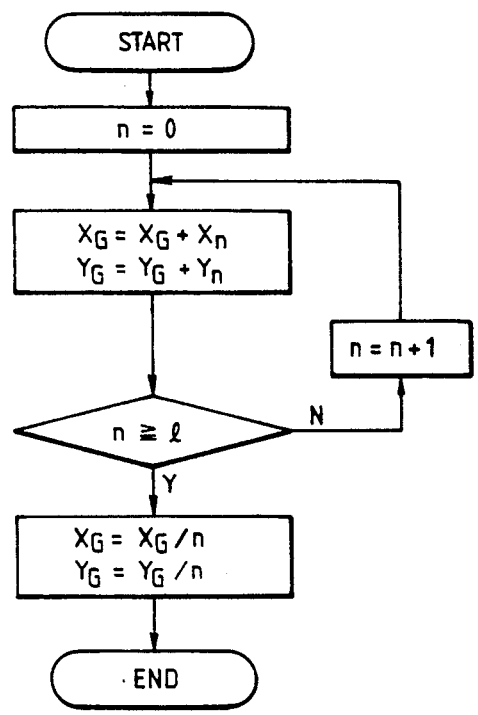
FIG. 9(K) is a flow chart showing a method of calculation a geommetrical center of gravity of an object.
Figure 14:
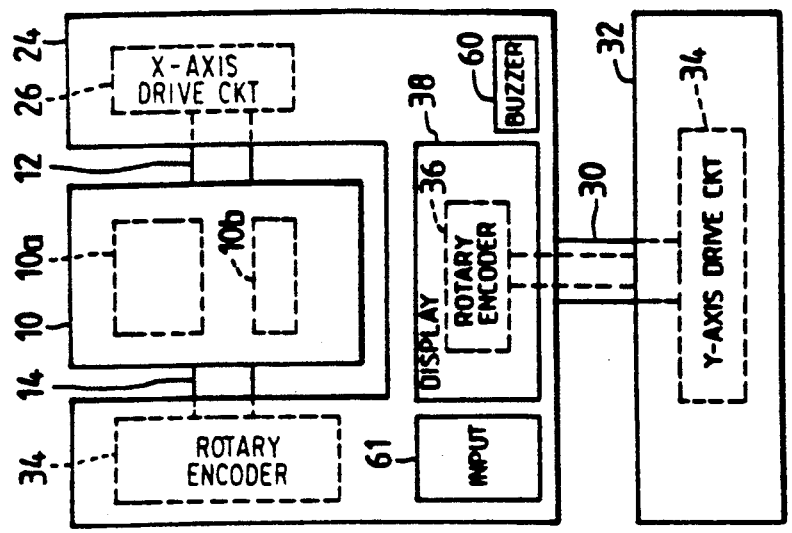
FIG. 14 is a diagram showing a front view of the fourth embodiment of the surveying instruction according to the present invention.
Figure 13:
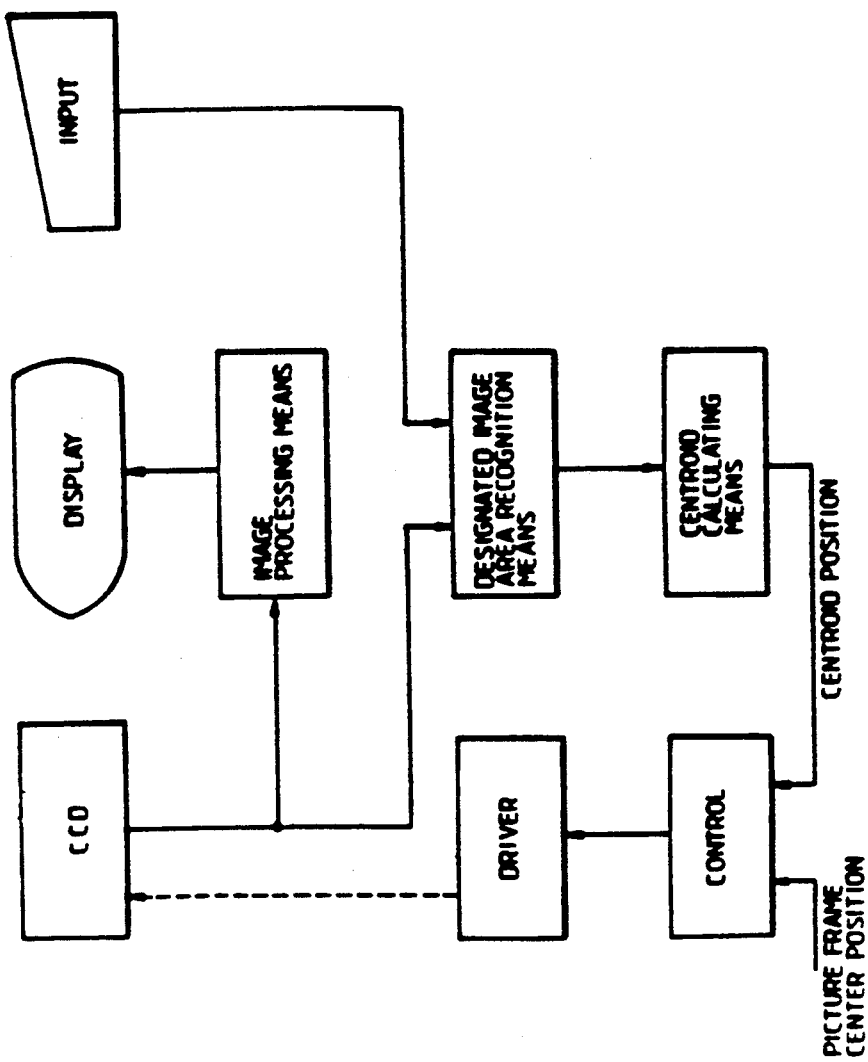
FIG. 13 is a block diagram showing basic features of the fourth embodiment of the present invention.

As described above, the calculation of the centroid of the aimed object is carried out in the step (5). FIG. 9(K) is a flow chart for the operation of calculating the geometric optical center of gravity of the object, and the optical center of gravity is calculated from data of coordinates of points in the boundary of the aimed object.

In the step (6), the coincidence judgement is carried out as described hereinbefore. If the coincidence is obtained in the step (6), a processor for angle conversion operates to process the data for elevation and horizontal angle values to superpose them onto the display. In case of incoincidence, the step returns to the step 3 through the steps (8), (9) and (10).

In the step (8), the amount of incoincidence, i.e., the operation amount and direction of operation of each dials 62 and 63 are calculated according to the flow chart shown in FIG. 9(L). The result of calculation in the step (8) is displayed in the step (9) on the display by the following manner.

$X_F=1$—Move the dial for X-axis in a clockwise direction;

$X_F=0$—Move the dial for X-axis in a counterclockwise direction;

$X_f=1$—Move the dial for Y-axis in a clockwise direction;

$Y_F=0$—Move the dial for Y-axis in a counterclockwise direction;

$X_Q=1$—Move the dial for X-axis by an amount corresponding to $\Delta$;

$X_Q=0$—Move the dial for X-axis by an amount corresponding to $\Delta/2$;

$Y_Q=13$ Move the dial for Y-axis by an amount corresponding to $\Delta$;

$Y_Q=0$—Move the dial for Y-axis by amount corresponding to $\Delta/2$.

The above described third embodiment may be modified as shown in FIG. 10, in which a solid-state image pickup element 10b is incorporated in the rotary table 24. Further, as shown in FIG. 12, plane mirrors $M_1$ and $M_2$ are internally provided in the telescope 10 and the rotary table 24 so as to form an image on the image pickup surface of the solid-state image pickup element 10b. The incident and reflecting points of the plane mirrors $M_1$ and $M_2$, respectively, are located on the center line of rotation of the telescope 10.

Figure 15A:
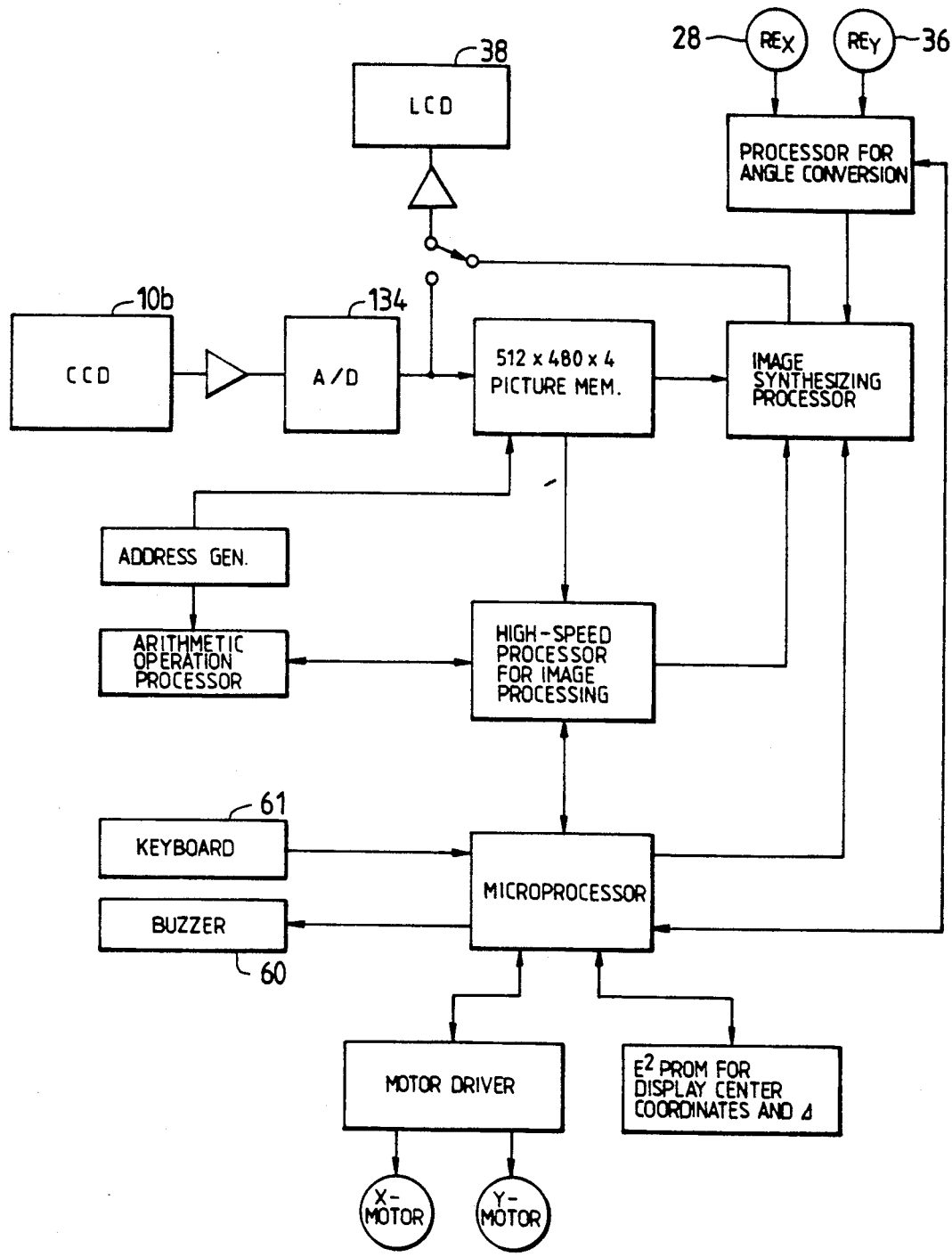
FIG. 15(A) is also block diagram a hardware of the fourth embodiment.

FIG. 15 is a block diagram showing a fourth embodiment of the present invention and FIG. 15(A) is a block diagram of hardware of the present invention. FIG. 15(B) is a flow chart for the system shown in FIG. 15(A).

In FIG. 15, the same components as those in FIG. 9 bear the same reference numerals. Reference numeral 135 designates a circuit of setting a reference distance value for coincidence detection. As is similar to FIG. 9, the software of the microcomputer is shown briefly by the use of function blocks 136a through 136g in FIG. 15.

It should be noted that the only difference between the third and fourth embodiments is that in the fourth embodiment, the optical system is moved automatically according to the data which is used to display the in-coincidence amount in the third embodiment.

Reference numeral 136a denotes an image synthesizing part. The image synthesizing part 136a stores temporarily a digital video signal supplied from the image processing circuit 134, and superposes onto the picture obtained by the element 10b on the display 38, azimuth data supplied from the rotary encoders 28 and 36, a designated area and an indication for indicating the fact that the center position of the picture frame of the display 38 coincides with the centroid of the designated image in the picture frame and the like. The drivers 138 and 140 operate to drive an X-axis rotation drive device 118 and a Y-axis rotation device 126 to rotate in directions and at speeds that are determined according to the outputs of the comparison part 136g, respectively. The comparison part 136g also operates to obtain the distance between the positions $P_G$ and $P_C$ so as to produce an output signal to the electronic buzzer 60 to produce a sound signal to inform the observer of the approximate coincidence of the points $P_G$ and $P_C$ when the thus obtained distance is smaller than the reference value set by the setting circuit 135. Upon the judgement of the approximate coincidence, the image synthesizing part 136a synthesizes data which indicates the coincidence between both positions, and the indication is displayed on the display 38 according to the data. An example of the indication on the display 38 which is carried out according to the data is character indication, and the character indication is superposed on the picture of the display 38.

Next, an operation of the fourth embodiment of the present invention will be described.

A picture which is obtained by superposing a numerical value indicating the azimuth of the telescope 10 onto a picture in the axial direction of the telescope 10 is displayed on the display 38. The observer actuates the setting circuit 135 to set an accuracy degree of collimation required and a reference value for coincidence judgement taking mechanical vibration of the telescope 10 into account. The setting of a larger reference value results in making the period of time for collimation shorter. The observer directs the axis of the telescope 10 to an object, and after confirming that an image of the object is formed on the display 38, the operator actuates the input unit 61 to designate the opposing vertices either A and C or B and D of the area ABCD in which the object is contained as shown in FIG. 11. The frame line of ABCD is displayed on the display 38.

If the observer judges the area ABCD to be an appropriate area, he inputs confirmation by operating the input unit 61. Upon inputting of that signal, the frame line ABCD goes out of the display, the boundary lines in the area ABCD are subjected to examination and selection and the boundary line $BL_1$ of a designated area for instance is then displayed on the display 38. Subsequently, the position of the geometric optical center of the designated image area surrounded by the boundary line $BL_1$ is obtained, and then the telescope 10 is driven by the devices 118 and 126 so that the position $P_G$ coincides with the center position $P_C$. During this coincidence movement, the calculation of the position $P_G$ is successively carried out. As the distance between the positions $P_G$ and $P_C$ becomes smaller, the driving speed of the telescope 10 becomes lower. When the distance becomes smaller than the reference value, the movement of the telescope 10 is stopped, the sound of the electronic buzzer 60 is produced, and an indication for indicating the approximate coincidence is displayed on the display 38. In case of judging the coincidence is observer stops the operation and takes the reading of the azimuth (azimuth of the collimation axis) of the telescope displayed on the display 38.

The above described fourth embodiment may be modified as shown in FIG. 12, in which a solid-state image pickup element 10b is incorporated in the rotary table 24. Further, plane mirrors $M_1$ and $M_2$ are internally provided in the telescope 10 and the rotary table 24 so as to form an image on the image pickup surface of the solid-state image pickup element 10b. The incident and reflecting points for the plane mirrors $M_1$ and $M_2$, respectively, are located on the center line of rotation of the telescope 10.

In the above embodiments, description has been made for the case of recognizing the boundary of a designated image after designating the area including the designated image. However, if the boundary of each of the images are recognized beforehand and then one of these boundary lines or an area surrounded by the boundary line is designated, it is unnecessary to designate the area. In such a case, the designation of just one point suffices the designation of the boundary or the area.

In addition, the degree of coincidence of the designated image centroid and the screen center position may be informed by changing a tone of the electronic buzzer sound, cycle of turning on/off of the buzzer or the like. When approximate coincidence of both positions is obtained, the central portion of the picture may be displayed expanded in the whole or a part of the display surface. The setting of the reference distance for coincidence judgment may be carried out for each of the X- and Y-axis directions.

As described above, with a surveying instrument according to the present invention, since it is possible to adjust the optical system manually or automatically so that the collimation axis of the optical system coincides with the object over watching the display, accurate collimation is always attained regardless of circumstances of the object, observers' ability and the like. Further, according to the present invention, since is is possible to adjust the telescope so as to coincide the centroid position of the designated image with the center of the display over watching the display automatically or manually, accurate collimation can be always attained.

What is claimed is:

1. A surveying instrument comprising:
optical system means having an optical axis to be coincided with an object to be observed, said optical system means being an optical system block including integrally a telescope, means for producing an electrical signal to display a picture including the object to be observed and display means for displaying the picture;
means for designating a designated area of the image in which the object is contained;

means for detecting a boundary line within the designated area which surrounds the object using differential processing;

means for recognizing the object in the picture surrounded by the boundary line;

means for obtaining a two-dimensional geometric optical center of gravity of the object surrounded by the boundary line; and positional deviation detecting means for detecting the deviation of said optical axis with respect to the object, said position deviation detecting means detecting the deviation between the center of a picture frame of said display means and the geometric optical center of gravity of the object; and said display means further displaying the detection result of said positional deviation detecting means.

2. A surveying instrument as defined in claim 1 further comprising:

an input means for inputting data to be displayed on said display means; and means for detecting approximate coincidence of the center of the picture frame and the geometric optical center of gravity of the object, said detecting means producing an indication when the approximate coincidence is obtained.

3. A surveying instrument as defined in claim 1 further comprising driving means for driving said telescope so as to eliminate the deviation according to the output of said position deviation detecting means.

4. A surveying instrument as defined in claim 3 further comprising:

an input means for inputting data to be displayed on said display means; and means for detecting approximate coincidence of the center of the picture frame and the geometric optical center of gravity of the object, said detecting means producing an indication when the approximate coincidence is obtained.

5. A surveying instrument comprising:

optical system means having an optical axis to be coincided with an object to be observed, said optical system means comprising a light source, an optical system for directing a light beam from said light source to a light reflecting means attached to the object and for projecting the light beam reflected by said light reflecting means onto a light receiving surface of a light receiving means so as to form a light spot thereon, and a light beam position detecting means for detecting the position of said light spot on said light receiving surface;

positional deviation detection means for detecting the deviation of said optical axis with respect to the object by calculating the difference between a predetermined position of said optical axis on said light receiving surface and said position of said light spot detected by said light beam position detecting means; and means for automatically driving said optical system according to the detection result of said positional deviation detecting means so as to bring said axis in coincidence with said object, wherein said means for automatically driving said optical system brings said axis in coincidence with the object only when an absolute value of said difference between said predetermined position of said optical axis and the detected position of said light spot is within a predetermined value.

6. A surveying instrument as defined in claim 5, wherein said predetermined value is calculated in response to an allowable range provided by a coincidence value setting means.

7. A surveying instrument as defined in claim 6, wherein said predetermined value is equal to one-half the value of said allowable range.

8. A surveying instrument, comprising:

optical system means having image pick-up means for receiving an image of an object in the direction of an optical axis of said optical system means and for producing picture element signals;

display means for displaying a picture in accordance with the picture element signals; and image processor, operatively connected to said optical system means, including at least means for storing picture frame center coordinates of said display means;

means for designating a designated area of the image in which the object is contained;

means for detecting a boundary line within the designated area which surrounds the object using differential processing;

centroid determination means for determining geometric center coordinates of the image of the object surrounded by the boundary line; and means for determining whether the picture frame center coordinates and the geometric center coordinates coincide based on a deviation between the picture frame center coordinates and the geometric center coordinates.

9. A surveying instrument as defined in claim 8, wherein said image processor further includes at least image synthesizing means for superposing onto the picture displayed by said display means a first indicator indicating the center of said display means and a second indicator indicating the geometric center of the image of the object.

10. A surveying instrument as defined in claim 8, wherein said apparatus further comprises control means for automatically positioning said optical system means based on the deviation until coincidence is determined.

11. A surveying instrument as defined in claim 8, wherein said apparatus further comprises audio output means for providing an audio sound when coincidence in determined.

12. A surveying instrument as defined in claim 8, wherein said apparatus further comprises first and second rotary encoders for supplying rotation information indicating horizontal and vertical rotation of said optical system means to said image processor.

13. A surveying instrument as defined in claim 8, wherein said surveying instrument operates to bring the optical axis of said optical system means of said surveying instrument in coincidence with the object.

14. A method for collimation of a surveying instrument having a lens system with an optical axis, by bringing the optical axis of the instrument in coincidence with an object, said method comprising the steps of:

(a) supplying a coincidence judging value;

(b) displaying an image of the object on a display having a display center position;

(c) designating a designated area of the image in which the object is contained;

(d) detecting a boundary line within the designated area which surrounds the object;

(e) determining coordinates of a centroid position of the object based on the boundary line;

(f) detecting a deviation between the display center position and the centroid position; and (g) determining coincidence of the optical axis and the object by comparing the coincidence judging value with the deviation.

15. A method as defined in claim 14, wherein the image is from a solid-state image pick-up device.

16. A method as defined in claim 14, wherein said method further comprises the step of (h) positioning the optical axis based on the deviation if step (g) determines a lack of coincidence.

17. A method as defined in claim 16, wherein said method further comprises step (i) repeating steps (f)–(h) until step (g) determines that the optical axis and the object coincide.

18. A method as defined in claim 14, wherein said method further comprises the step of (h) subsequently displaying, superimposed on the display, at least one of azimuth of the optical axis and the deviation.

* * * * *